United States Patent
Renaud-Goud

(10) Patent No.: US 8,593,710 B2
(45) Date of Patent: Nov. 26, 2013

(54) HOLOGRAPHIC PROJECTION DEVICE FOR THE RECONSTRUCTION OF SCENES

(75) Inventor: Philippe Renaud-Goud, Troyes (FR)

(73) Assignee: Seereal Technologies S.A., Munsbach (LU)

( * ) Notice: Subject to any disclaimer, the term of this patent is extended or adjusted under 35 U.S.C. 154(b) by 618 days.

(21) Appl. No.: 12/301,527

(22) PCT Filed: May 16, 2007

(86) PCT No.: PCT/EP2007/054781
§ 371 (c)(1),
(2), (4) Date: Oct. 6, 2009

(87) PCT Pub. No.: WO2007/135068
PCT Pub. Date: Nov. 29, 2007

(65) Prior Publication Data
US 2010/0033784 A1  Feb. 11, 2010

(30) Foreign Application Priority Data
May 19, 2006 (DE) .......................... 10 2006 024 356

(51) Int. Cl.
*G02B 5/32* (2006.01)
*G03H 1/12* (2006.01)
*G03H 1/16* (2006.01)

(52) U.S. Cl.
USPC .................................. 359/17; 359/11; 359/29

(58) Field of Classification Search
USPC ........................................................ 359/17
See application file for complete search history.

(56) References Cited

U.S. PATENT DOCUMENTS

| | | | |
|---|---|---|---|
| 5,652,666 A | | 7/1997 | Florence et al. |
| 6,195,184 B1 * | | 2/2001 | Chao et al. ...................... 359/32 |
| 7,057,580 B1 * | | 6/2006 | Ivanov .............................. 345/4 |
| 2005/0084801 A1 * | | 4/2005 | El-Hafidi et al. .......... 430/289.1 |
| 2006/0055994 A1 * | | 3/2006 | Schwerdtner ................... 359/15 |

FOREIGN PATENT DOCUMENTS

WO  WO 2006/109916  10/2006
WO  WO 2007/099457  9/2007

OTHER PUBLICATIONS

Fukaya et al., "Eye-Position Tracking Type electro-Holographic Display Using Liquidcrystal Devices," Asia Display, pp. 963-964 (1995) SP002940561.
International Search Report, dated Aug. 31, 2007, issued in priority Application No. PCT/EP2007/054781.

* cited by examiner

*Primary Examiner* — Jade R Chwasz
(74) *Attorney, Agent, or Firm* — Saul Ewing LLP

(57) ABSTRACT

A holographic projection device comprises for the reconstruction of scenes at least one light source which emits sufficiently coherent light for the generation of a wave front. Further, the projection device comprises at least one light modulator device containing modulation element, said projection device being of a two-dimensional design. The light modulator device and a scanning element are combined such that the light emitted by the scanning element only scans one one-dimensional arrangement of modulation elements of the two-dimensional light modulator device at a time.

17 Claims, 15 Drawing Sheets

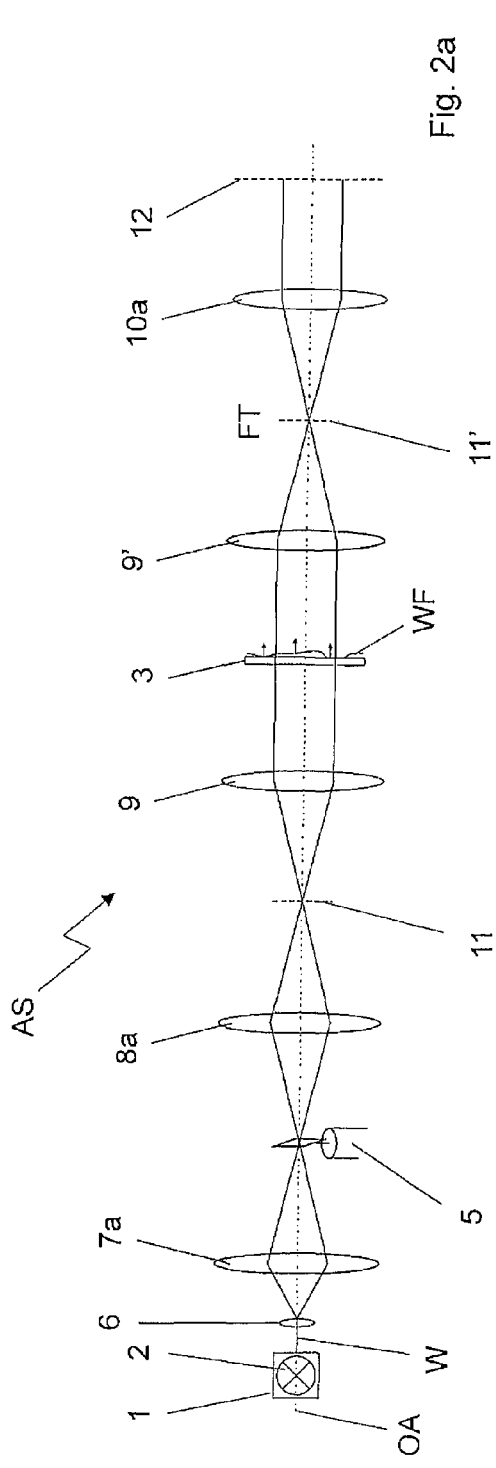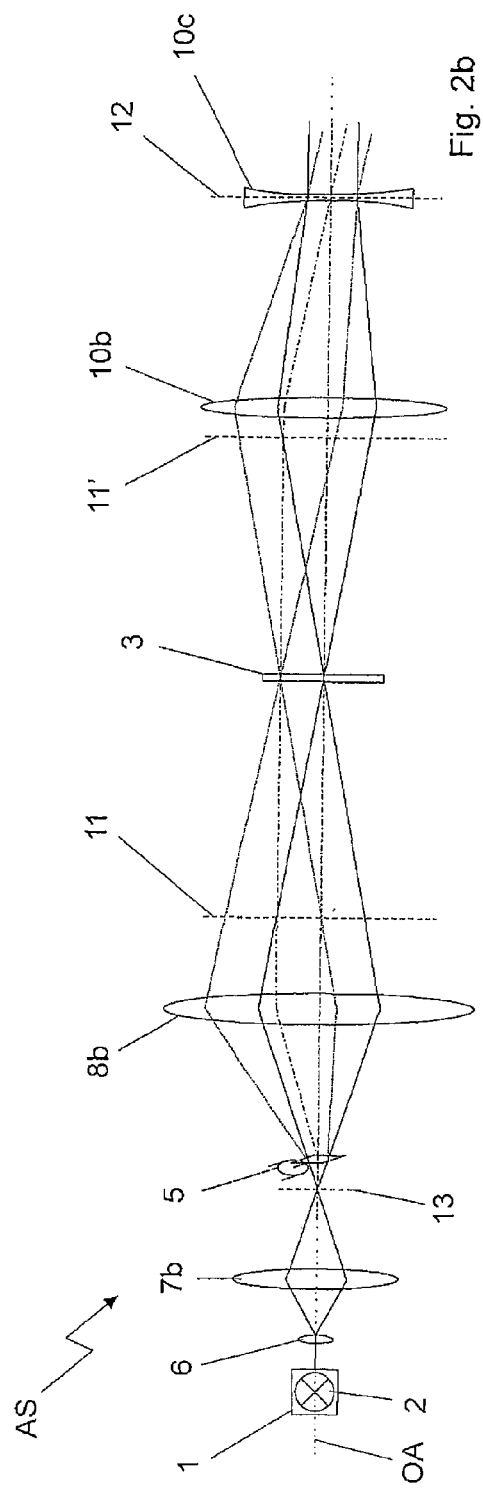

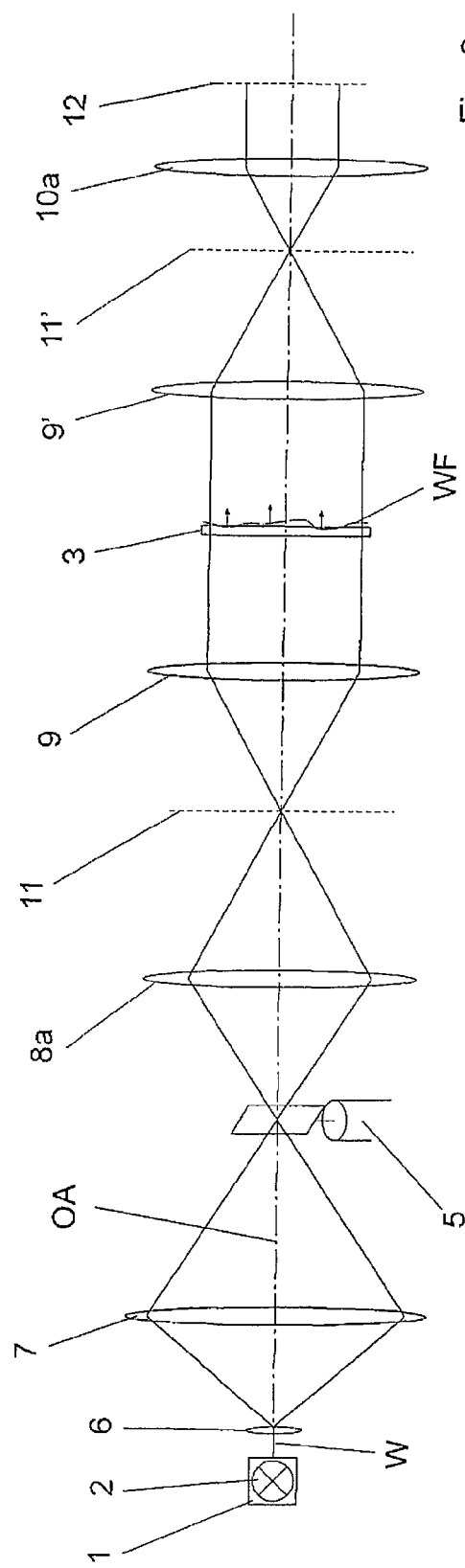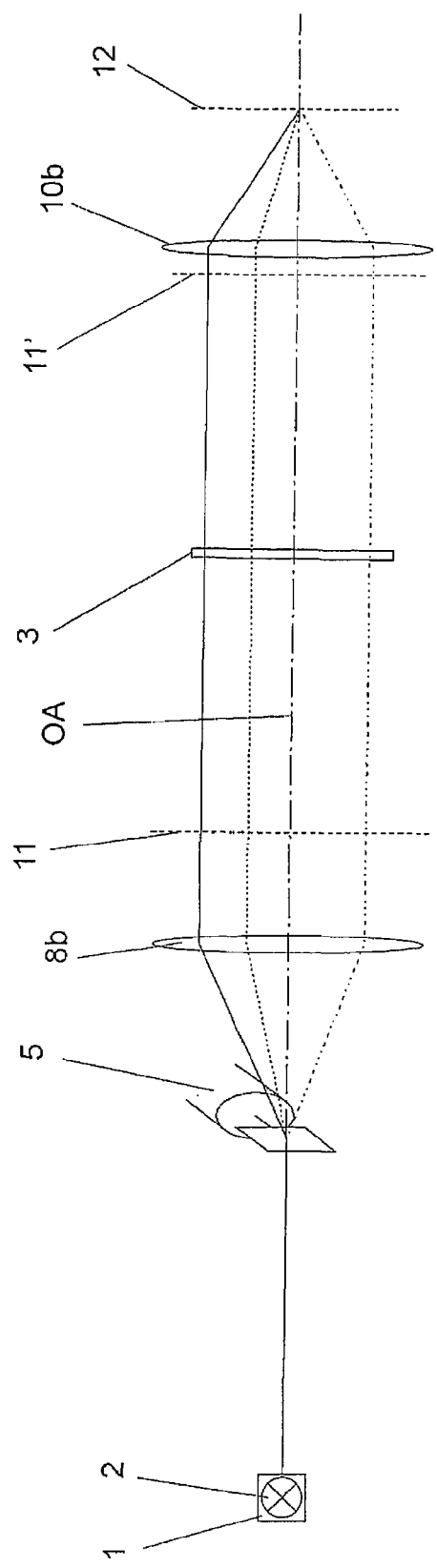

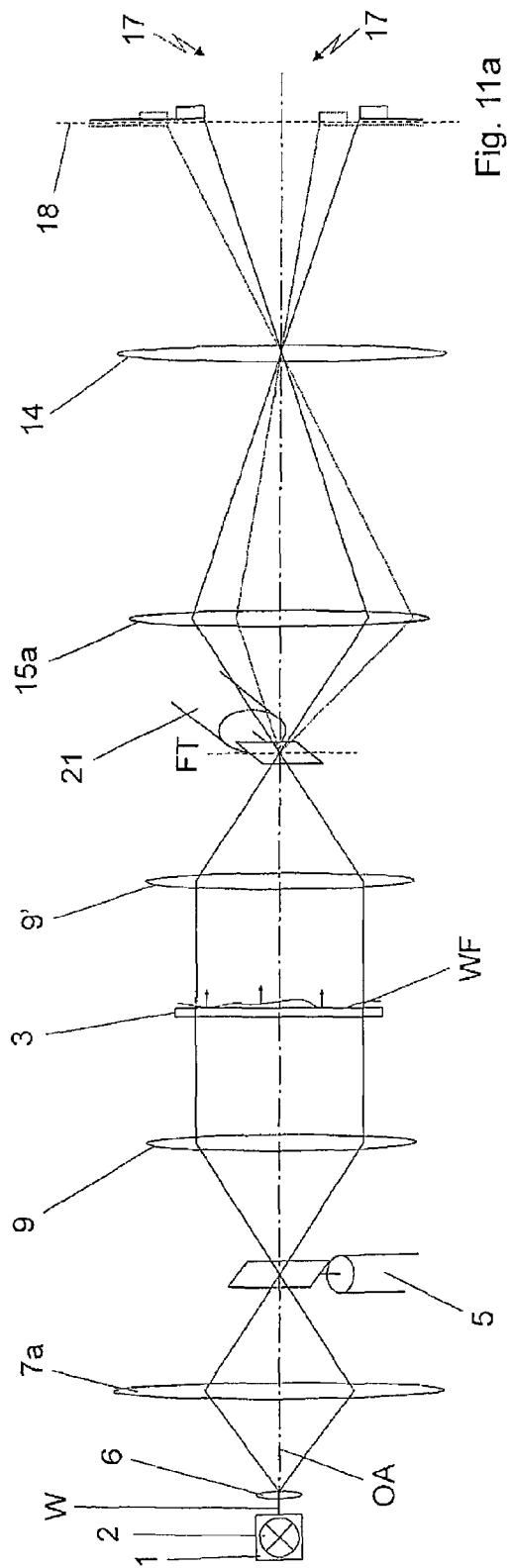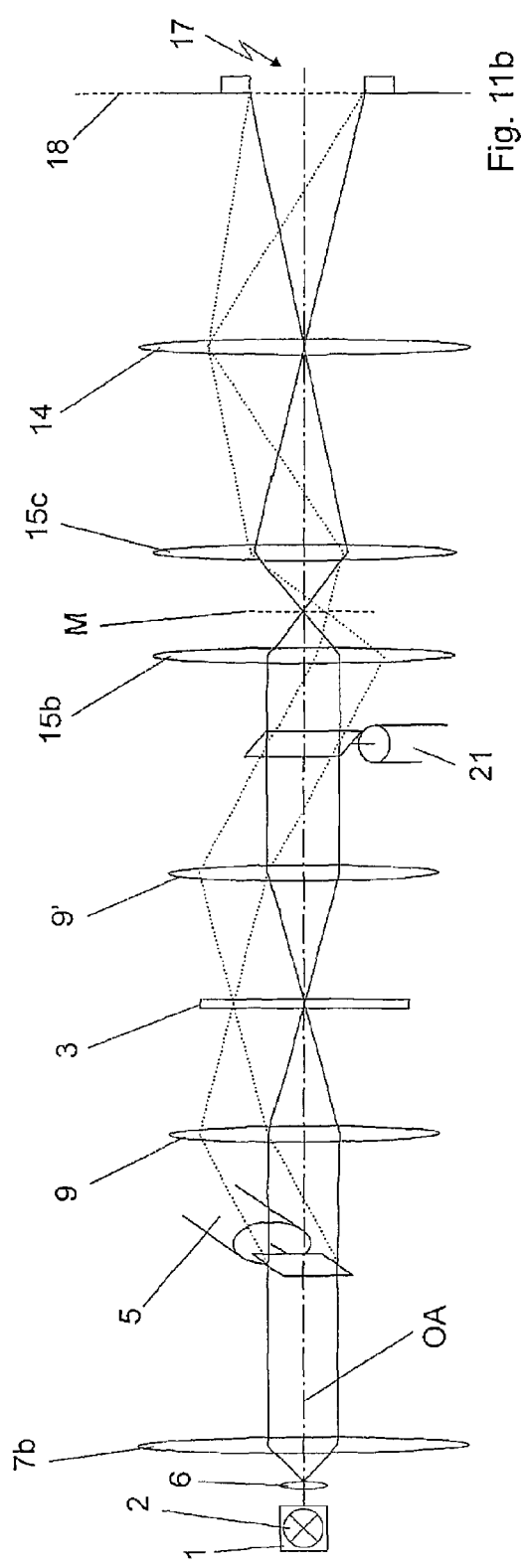

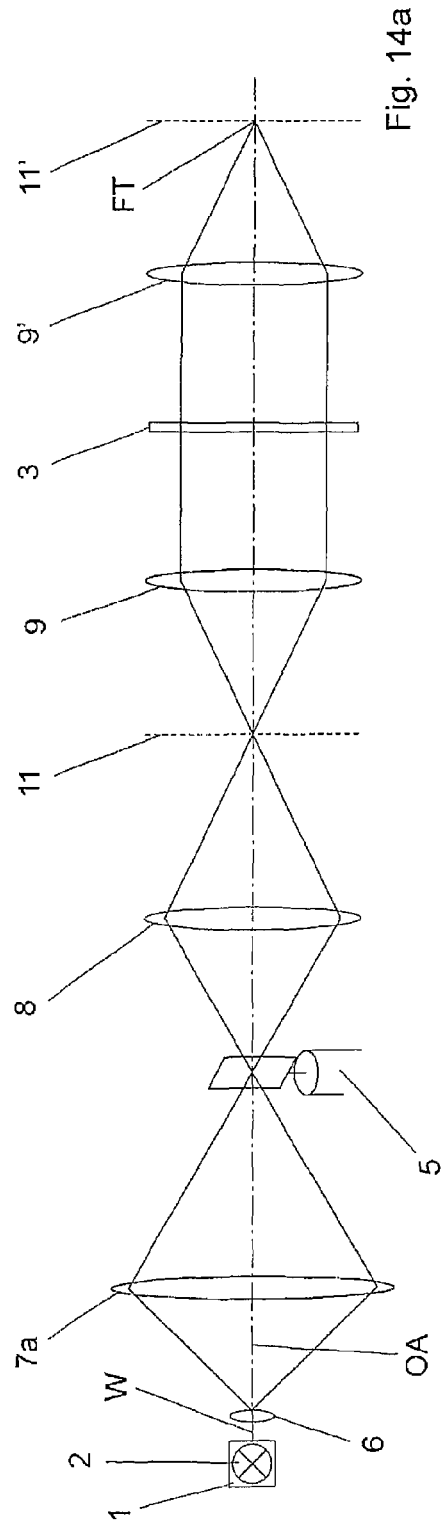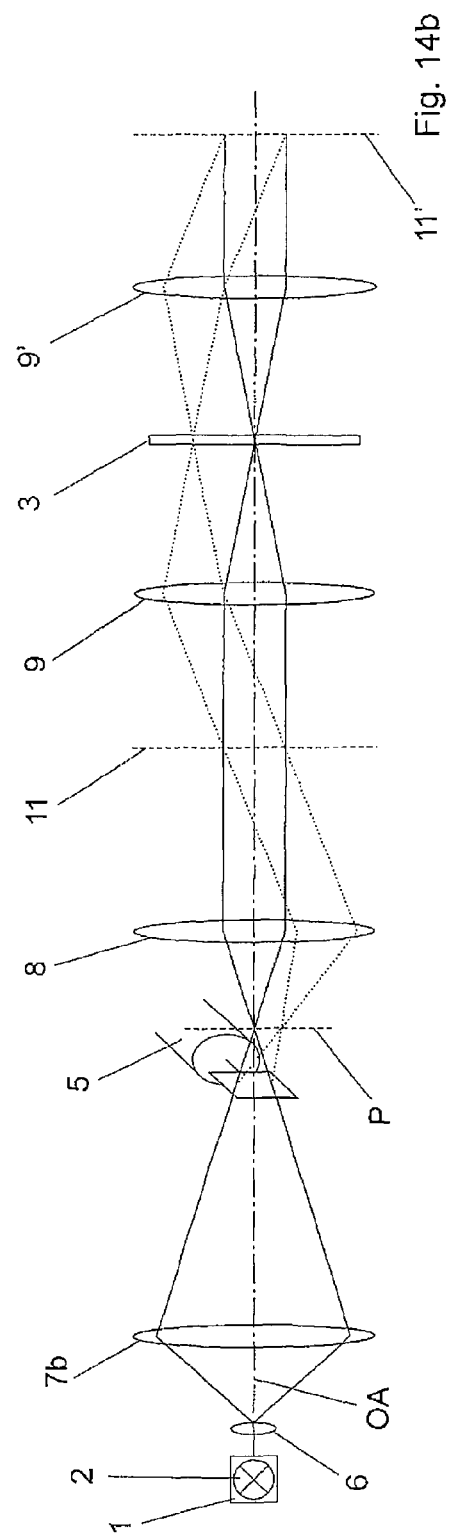

HOLOGRAPHIC PROJECTION DEVICE FOR THE RECONSTRUCTION OF SCENES

CROSS REFERENCE TO RELATED APPLICATIONS

This application claims the priority of PCT/EP2007/054781, filed on May 16, 2007, which claims priority to DE 10 2006 024356.0, filed May 19, 2006, the entire contents of which are hereby incorporated in total by reference.

FIELD OF THE INVENTION

The present invention relates to a holographic projection device for the reconstruction of scenes, said device comprising at least one light source which emits sufficiently coherent light which is used to generate a wave front, and at least one two-dimensional light modulator device which comprises modulation elements. The invention further relates to a method for the holographic reconstruction of scenes.

BACKGROUND OF THE INVENTION

It is commonly known to use holographic techniques in order to reproduce a real three-dimensional scene of an object, said scene containing all depth information which is used by the human brain in image processing. Holography is a technique for recording and later reproduction of amplitude and phase distributions of a wave front. More precisely, an interference pattern of coherent light reflected by an object and light which comes directly from a light source is recorded on a recording medium, such as a photographic plate. If the interference pattern, which is also known as a hologram, is illuminated with coherent light, a three-dimensional scene will appear in a volume. Typically, a real three-dimensional object is used to generate a hologram using known methods and techniques; thus generated holograms are known as true holograms. However, computer-generated holograms (CGH) may be used as well.

Usually, the reconstructed scene is viewed directly, i.e. the observer looks on to the computer-generated hologram, for example, which comprises regularly arranged pixels which have been encoded in accordance with the hologram values. Due to the discrete recording and because of the effects of diffraction, the reconstruction of the CGH is only possible within one periodicity interval of the diffraction spectrum, which is defined by the resolution of the CGH-bearing medium. The reconstruction is typically repeated showing irregularities in adjacent periodicity intervals.

Reversible CGH recording media include spatial light modulators, such as LCD (liquid crystal displays), LCoS (liquid crystal on silicon), OASLM (optically addressed spatial light modulator) etc., which modulate the phase and amplitude of incident light. Further, it is known that MEMS-based light modulators can be used to modulate phase and/or amplitude of light. Optical elements which transform the CGH into the desired plane are also often used for reconstructing two- and three-dimensional scenes.

U.S. Pat. No. 5,172,251, for example, discloses a projection device with a one-dimensional light modulator for reconstructing a three-dimensional scene. The light modulator is an acousto-optic modulator which is controlled by modulation signals of a data processing system, thus encoding a one-dimensional hologram. The reconstruction is diminished with the help of several optical elements, so as to increase the viewing angle in the horizontal direction. A horizontal scanner continuously combines partial holograms of the scene and balances the movement of the partial holograms along the modulator. The horizontal scanner is synchronised with the speed of the acoustic wave, so that the scanned areas of the original image from the modulator appear fixed in the reconstructed scene. In addition, a vertical scanner is provided in order to position in the vertical direction the horizontal one-dimensional holograms.

However, because that projection device uses an acousto-optic modulator (AOM), it exhibits the disadvantage of requiring additional elements such as the horizontal scanner which aims to balance the signal movement. This makes the design rather difficult and complex. Moreover, the modulator must work at high speed. Another drawback is the small aperture of the AOM, which requires sub-holograms to be stringed together.

EP 1 467 263 A1 also discloses a holographic display device for reconstructing a three-dimensional scene. The display device comprises a reflective light modulator, a beam splitter for projecting a hologram, a light source, a shutter, a field lens and a collimator lens. The hologram is generated on a computer using three-dimensional object information and then displayed on the light modulator. The light modulator is then illuminated with light emitted by the light source and imaged through the beam splitter, such that a three-dimensional scene is reconstructed. The reconstructed scene is thereby created around the field lens. A colour reconstruction of the scene, where the colour light sources are disposed close to each other, is also mentioned. These light sources simultaneously emit light of different wavelengths.

SUMMARY OF THE INVENTION

The above described holographic display device exhibits the following disadvantages. The size of the reconstructed scene is limited by the size of the field lens. Further, the observer of the reconstructed scene only has limited freedom of movement; a tracking facility for an observer window for an observer eye has not been proposed. Moreover, the diffraction orders recur periodically in the Fourier plane.

Now, the object of this invention is to provide a device and method for holographic reconstruction of scenes which prevails over the afore-mentioned disadvantages of the prior art, said device and method being able to deliver reconstructions of two- and/or three-dimensional scenes in a shorter computing time and in a larger observer range compared with conventional holographic display devices, even if one or multiple observers move.

According to the present invention, this object has been achieved by providing at least one scanning system and one projection system, where the scanning system comprises at least one scanning element, and where the light modulator device and the scanning element are combined such that the light emitted by the scanning element scans, one after another, one-dimensional arrangements of modulation elements of the two-dimensional light modulator device, where the scanning system is designed such that it sequentially creates a wave front which contains the information required for reconstructing a wave front, and where the projection system is designed such that it subsequently reconstructs the scene.

The holographic projection device according to the invention comprises at least one light source which emits coherent light, and at least one light modulator device. The light modulator device comprises modulation elements, so-called pixels, which encode the scene to be reconstructed. Further, the light modulator device is of two-dimensional design. The holographic projection device further comprises at least one scanning system and one projection system. By dividing the holographic projection device according to the invention into two independent systems, namely a scanning system and a projection system, it is possible to replace the currently used projection system or scanning system for a different desired or required system easily, quickly and uncomplicatedly. A scanning element comprised in the holographic projection device, specifically in the scanning system, is combined with the light modulator device such that the scanning element scans with coherent light, one after another, one-dimensional arrangements of modulation elements, i.e. only one line or one column of the two-dimensional light modulator device, at a time. This means that the entire two-dimensional light modulator device is not scanned at once, but always one only one-dimensional arrangement of modulation elements at a time. The individual one-dimensional arrangements are scanned one after another, as already mentioned above. The scanning system is therein provided for sequentially generating a wave front which contains the information required for reconstructing a scene. The projection system is intended for reconstructing the scene subsequently. The scanning element used can be a resonance scanner, MEMS (micro electro mechanical system), piezo mirror, galvanometer scanner or similar element.

This way a holographic projection device for simple and quick reconstruction of two- and three-dimensional scenes in a large reconstruction volume is provided. The time needed for hologram computation is significantly shortened because a one-dimensional fast Fourier transformation is performed only instead of a much more complex two-dimensional fast Fourier transformation. Conventional two-dimensional light modulator devices can preferably be used in the projection device according to the invention. It is thus not necessary anymore to use very fast two-dimensional light modulator devices. All modulation elements of the two-dimensional light modulator device are controlled in accordance with the target wave front, so that each one-dimensional arrangement, i.e. line or column, is scanned with sufficiently coherent light by the scanning element. This way, the light modulator device can be scanned faster without the need to increase the speed of controlling the light modulator device itself. In the projection device according to the invention, the one-dimensional arrangement, i.e. line or column, can be recoded while a different one-dimensional arrangement of the two-dimensional light modulator device is scanned, whereas in a one-dimensional light modulator device the modulation elements must be recoded after each scan.

It is also possible to use less conventional two-dimensional light modulator devices, such as a light modulator device based on micro-mirror elements, where for example the micro-mirror elements can be displaced axially and tilted around an axis. In such a light modulator device, the advantage is that the enlargement of the observer window in one direction is based on the design of the light modulator device, and the enlargement in the other direction is based on the special construction of the projection device according to the invention. Such light modulator devices can be, for example, MEMS, membrane mirror systems, OASLM or AOM (acousto-optic modulator).

Further, the light modulator device used is preferably an expanded spatial light modulator device and not a limited modulator, such as an acousto-optic modulator, which makes redundant additional elements such as the horizontal scanner described in U.S. Pat. No. 5,172,251 and their arrangement within the projection device.

It is advantageous if the holographic projection device is anamorphic, i.e. if it exhibits different magnification in two directions which are perpendicular to each other and perpendicular to the direction of light propagation. This is important for the wave front modulated by the modulation elements to propagate to, i.e. to be imaged to, the same position in an observer plane, for example to a virtual observer window where at least one observer eye is located, if the light modulator device is scanned line by line. This helps to prevent the light from being vignetted. The same applies accordingly if the light modulator device is scanned column by column. Another advantage is that an enlargement of the observer window in the scanning direction, which is also referred to as the non-coherent direction below, becomes possible, even if such great magnification in the other direction, also referred to as the coherent direction below, is limited by the scanning theory.

According to another preferred embodiment of the invention, a reproduction scale and screen size can be chosen such that a periodic continuation of diffraction orders of the Fourier transform lies outside the screen. This exhibits the advantage that the periodic continuation of the diffraction orders is displaced out of the screen, and only one period is visible on the screen. This means that an observer of the reconstructed scene does not perceive the periodic continuation of the reconstruction in the various diffraction orders. The image quality is thus considerably improved compared with prior art devices.

In order to make available a virtual observer window for one or multiple observers in a large observer range, a position detection system may be used to detect eye positions of at least one observer in an observer plane when viewing the reconstructed scene.

The position detection system detects and tracks changes in the eye positions of the observer or observers who view the reconstructed scene, whereupon the reconstructed scene is encoded such that it becomes visible depending on the change in the eye position of the observer(s) in the horizontal, the vertical and/or the axial direction. This is particularly advantageous in order to be able to update the position and/or content of the reconstructed scene according to a changed eye position. Then, the virtual observer window can be tracked according to the new eye position.

At least one deflection element may preferably be used to track a virtual observer window in the observer plane according to a change in the eye positions of the observer. Such deflection elements can be mechanical, electric, magnetic or optical elements, such as galvanometer mirrors, MEMS or acousto-optic elements.

The object of the invention has further been achieved by a method for the holographic reconstruction of scenes, where at least one light source illuminates at least one two-dimensional light modulator device comprising modulation elements with sufficiently coherent light, where only one-dimensional arrangements of modulation elements of the two-dimensional light modulator device are scanned, one after another, by the scanning element, so that multiple one-dimensional wave fronts are generated, where a wave front which contains the information required for reconstructing a scene is generated sequentially with the help of the one-dimensional wave fronts, and whereupon a scene is reconstructed.

According to the novel method, sufficiently coherent light, which is emitted by an illumination device, is directed on to a scanning element for holographic reconstruction of two- and/or three-dimensional scenes. The scanning element scans with coherent light individual one-dimensional arrangements of modulation elements of a two-dimensional light modulator device, one after another. This way, multiple one-dimensional wave fronts are generated one after another. Each one-dimensional wave front only represents a part of a scene, in particular a three-dimensional scene, to be reconstructed. A wave front which contains the information required for reconstructing a scene is generated sequentially with the help of the one-dimensional wave fronts, in order to subsequently reconstruct a scene, in particular a three-dimensional scene. Scanning only one line or column of the two-dimensional light modulator device at a time makes it possible to avoid great computational load and to reduce the time needed for computation, because a one-dimensional Fourier transform must be computed and encoded only.

According to a preferred embodiment of the present invention, one Fourier transform of the light emitted by the light source and modulated by the light modulator device per one-dimensional arrangement of modulation elements may be imaged on to an optical element, which serves as a screen, where at least this optical element images a wave front modulated with the help of the light modulator device into a virtual observer window. However, it is also possible that the individual Fourier transforms are imaged into the virtual observer window, and not on to the screen. Accordingly, the modulated wave fronts are imaged on to the screen.

Further embodiments of the invention are defined by the other dependent claims. Embodiments of the present invention will be explained in detail below and illustrated in conjunction with the accompanying drawings. The principle of the invention will be explained based on a holographic reconstruction with monochromatic light. However, it will appear to those skilled in the art that this invention may be applied to colour holographic reconstructions as well, as indicated in the description of the individual embodiments.

BRIEF DESCRIPTION OF THE DRAWINGS

FIG. 2a shows schematically a scanning system according to the invention and illustrates the direction of propagation of the one-dimensional wave fronts and the direction of light propagation (coherent direction).

FIG. 2b shows schematically a scanning system according to the invention and illustrates the scanning direction and the direction of light propagation (non-coherent direction).

FIGS. 9a and 9b show schematically a simplified scanning system according to the present invention in the coherent and non-coherent direction.

FIGS. 11a and 11b show schematically a very compact holographic projection device according to the invention in the coherent and non-coherent direction.

FIGS. 14a and 14b show schematically a second possibility of the functional principle of the holographic projection device according to the invention, where only the scanning system is shown in the coherent and non-coherent direction.

Now, the design of the holographic projection device according to the invention and the reconstruction of a scene, preferably a three-dimensional scene, will be described.

DETAILED DESCRIPTION OF THE INVENTION

Figure 1:
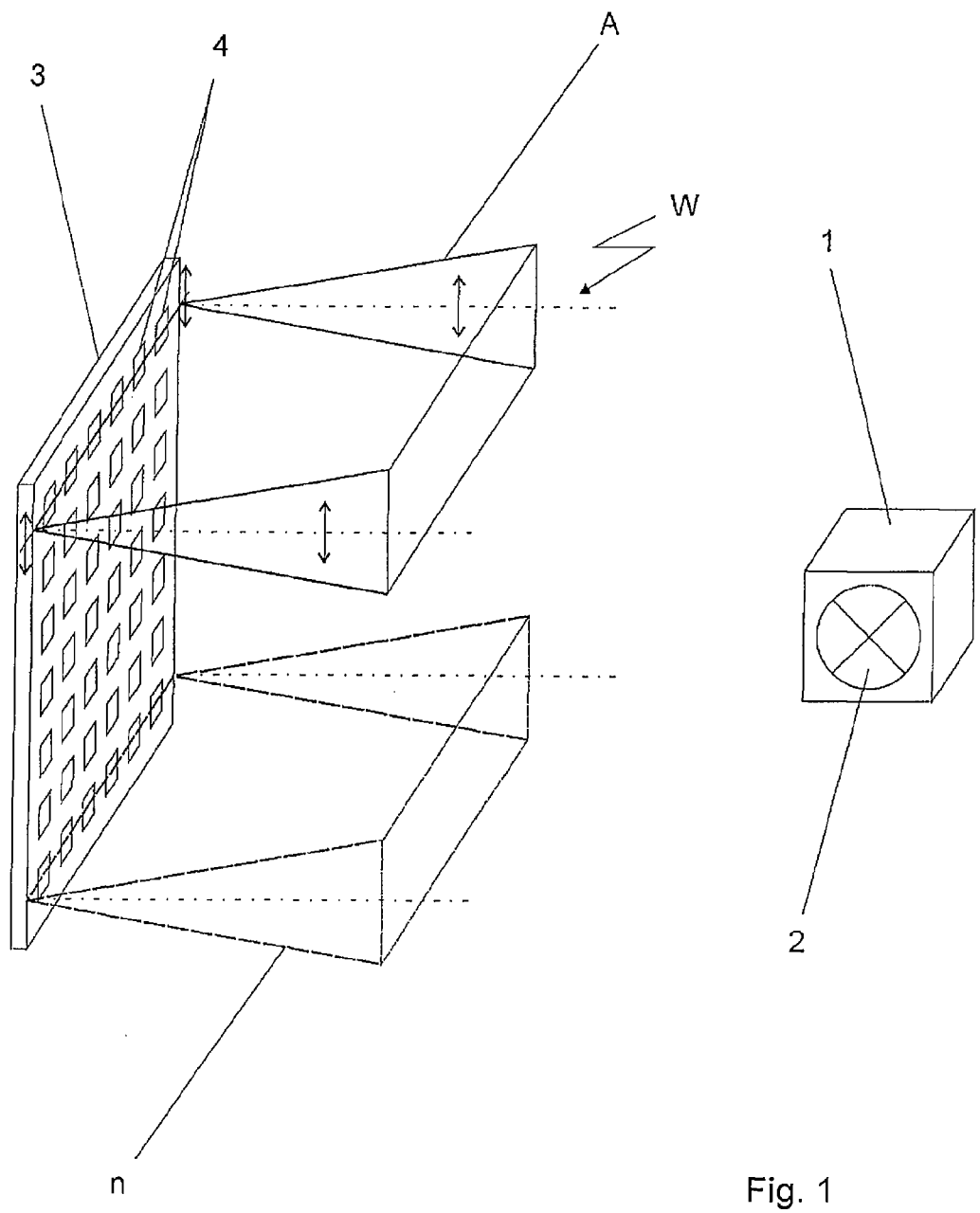
FIG. 1 shows schematically a two-dimensional light modulator device combined with the scanning system according to the invention.

FIG. 1 shows an illumination device 1 with a light source 2 for illuminating a light modulator device 3. The illumination device 1 and the light modulator device 3 are disposed at certain positions in the holographic projection device. However, this arrangement is only explained in FIG. 5. The light source 2 emits sufficiently coherent light. In this document, the term 'sufficiently coherent light' denotes light which is capable of generating interference for the holographic reconstruction of a three-dimensional scene. The light source 2 of the illumination device 1 can be made of laser diodes, DPSS lasers (diode-pumped solid state lasers) or other lasers. Other light sources, e.g. LED (light emitting diodes), can be used as well as long as they emit sufficiently coherent light. However, such light sources should be filtered so as to achieve a sufficient degree of coherence.

This Figure shows in detail how the light modulator device 3 is scanned by a scanning element (not shown). The scanning element is shown in detail in FIGS. 2a and 2b. The light modulator device 3 can be a conventional light modulator device, such as a LCD, LCoS, OASLM, MEMS panel, or any other modulating device. Moreover, the light modulator device 3 can be of a reflective or transmissive type. As can be seen in the Figure, the light modulator device 3 to be scanned is a two-dimensional panel which comprises modulation elements 4. The modulation elements 4 can be pixels or mirror elements which act like pixels. However, the panel is not scanned two-dimensionally, but one-dimensionally, i.e. only one line (as shown in the Figure) or column is scanned at a time by the scanning element. Each one-dimensional arrangement of the modulation elements 4 modulates an incident wave front W, whereby the modulated wave front only represents a part of a scene to be reconstructed, or, in other words, only a part of the two-dimensional wave front to be reconstructed. The process of scanning the light modulator device 3 can be explained as follows. The light source 2 emits light in a sufficiently narrow gap, i.e. for example using a line light source, said light being directed towards the scanning element. The scanning element, which can be a resonance scanner, piezo scanner, galvanometer scanner or similar element, moves such that the wave front W emitted by it, which is preferably a plane wave front, is directed on to the desired one-dimensional arrangement of modulation elements 4 to be scanned, as shown in the Figure for position A. By moving the scanning element further, the one-dimensional arrangements of modulation elements 4 are scanned with the light of the light source one after another in the direction indicated by the arrows, until a position n is achieved. It is of course also possible to scan the panel in the other direction, i.e. starting with position n and ending at position A. Moreover, it is possible to scan any one-dimensional arrangement of modulation elements 4 and/or to proceed to scan the other arrangements in arbitrary order. It can thus be seen that the scanning element is combined with the light modulator device 3 in order to reach a desired arrangement of modulation elements 4 for scanning with the light. A line arrangement, as shown in the Figure, can for example be scanned from top to bottom and back up, or from top to bottom and from top to bottom again, or in any arbitrary order.

Before the light modulator device 3 is scanned the first time by the scanning element, the modulation elements 4 are addressed and brought to the required modulation position. The individual one-dimensional arrangements of modulation elements 4 can then be scanned as described above. The modulation elements 4 can be readdressed after having fully scanned all one-dimensional arrangements in the light modulator device 3. Consequently, the modulation elements 4 must only be addressed again after having scanned all one-dimensional arrangements, whereby the switching time of the modulation elements 4 is reduced. Alternatively, it is also possible to readdress each one-dimensional arrangement immediately after it has been scanned. This option also provides the benefit of time saving. This is particularly advantageous if a light modulator device 3 based on micro mirrors is used for example, where all modulation elements 4 are mirror elements which can either only be displaced axially or both be displaced axially and tilted around an axis.

FIGS. 2a and 2b only show a sub-system of the holographic projection device, where the optical path is a non-folded optical path. The embodiments described below also show non-folded optical paths. This sub-system is called the scanning system AS and comprises the illumination device 1 with light source 2, the scanning element 5, the light modulator device 3 and imaging elements 6, 7, 8, 9, 9' and 10. The imaging element 7 comprises lens elements 7a and 7b, the imaging element 8 comprises lens elements 8a and 8b, and the imaging element 10 comprises lens elements 10a, 10b and 10c. The imaging elements 6, 7, 8, 9, 9' and 10 can be lenses, in particular cylindrical lenses, spherical lenses, corrected cylindrical or spherical lenses, diffractive optical elements (DOE), Fresnel lenses, but also mirrors or arrangements of several such elements. Further, the imaging elements 6, 7, 8, 9, 9' and 10 may also be disposed off-axis, which facilitates to reduce aberrations, such as field curvature. The holographic projection device is anamorphic, i.e. the projection systems and thus the degrees of magnification in two directions of the projection device which are perpendicular to each other are different. This is why it must be noted that FIG. 2a shows the scanning system AS in the direction of propagation of the one-dimensional wave front and in the direction of light propagation. This direction will be referred to below as the coherent direction. FIG. 2b shows the scanning system AS in the scanning direction and in the direction of light propagation. This direction will be referred to below as the non-coherent direction. Imaging elements which have no optical effect in one of these directions, as is the case with cylindrical imaging means for example, are omitted in the corresponding drawing.

Now, the functional principle of the scanning system AS in the coherent direction is described with reference to FIG. 2a. It is thereby advantageous if diffractive optical elements are used as imaging elements, because their design and functional principle are better suited to achieving aberration correction. The light source 2 of the illumination device 1 emits sufficiently coherent light in the form of a plane wave W, which is directed on to the imaging element 6 for broadening. The wave W then passes trough the lens element 7a of the imaging element 7, which is for example a cylindrical lens, and is focussed on to the scanning element 5. The scanning element 5 is then imaged by the lens element 8a of the imaging element 8 into a plane 11 such that the wave W, which is focussed on the scanning element 5, is also focussed in this plane 11. It is thereby possible to dispose a deflection element, such as a mirror, in plane 11. If a reflective light modulator device 3 is used, the deflection element is advantageous to prevent the light on the way to the light modulator device 3 from overlapping with the light on the way back. Also if a transmissive light modulator device 3 is used, such deflection element may be used for reasons of compactness. After having passed plane 11, the wave is imaged by the imaging element 9 as a collimated wave or plane wave on to the light modulator device 3. The light modulator device 3 is a reflective light modulator device in this embodiment and in the embodiments described below, so that a wave W with a preferably plane wave front is reflected as a modulated wave with a wave front WF. The wave front WF thus modulated by the light modulator device 3 is then imaged by the imaging element 9' and the lens element 10a into a plane 12. In the case of a reflective light modulator device 3, the imaging element 9 is used as the imaging element 9'. The two imaging elements 9 and 9' are in this case combined to form one single imaging element. The imaging element 10 comprises three cylindrical lens elements. However, only one of the three lens elements is effective in the coherent direction, the other lens elements do not have any optical effect in that direction.

While the wave front WF is imaged, a Fourier transform FT is generated at the same time in the plane 11'. If a reflective light modulator device 3 is used, the planes 11 and 11' coincide so as to form one and the same plane. It is possible to dispose a deflection element, for example a mirror, in plane 11' in order to prevent the light on the way to the light modulator device 3 from overlapping with the light on the way back. Further, such deflection element may also be provided if a transmissive light modulator device 3 is used, for reasons of compactness. The Fourier transform FT impinges with the help of the lens element 10a as a collimated bundle of rays into plane 12. In conjunction with a reflective light modulator device 3, the imaging of the wave front WF into plane 11' is provided preferably in order to reduce aberrations. However, this imaging is not necessarily required if a transmissive light modulator device 3 is used. Because this embodiment and any other embodiments described below are only shown schematically, it must be noted that the imaging elements 9 and 9' are represented by one single imaging element, because the light modulator device 3 is of a reflective type, so that the modulated wave front WF is reflected back into plane 11' (=11). Planes 11 and 11' are thus one and the same plane.

In the non-coherent direction, shown in FIG. 2b, Fresnel lenses or diffractive optical elements are preferably used as imaging means 6, 7, 8 and 10. The functional principle of the scanning system AS in the non-coherent direction is explained below. Here, two spatially offset arrangements of modulation elements 4 on the light modulator device 3 are scanned one after another, but these two scans are shown at the same time in the Figure. The beams of the light source 2 are broadened by the imaging element 6, focussed by the lens element 7b into a plane 13, which is disposed in front of the scanning element, seen in the direction of light propagation, and impinge on to the scanning element 5 with a defined extent in the non-coherent direction. The scanning element 5 deflects the beams according to the arrangement of modulation elements 4 of the light modulator device 3 to be scanned. From the plane 13, the beams are imaged by the scanning element 5 and the lens element 8b into the plane 11 and on to the light modulator device 3, as described with respect to FIG. 1. This means that the light deflected by the scanning element 5, or more precisely the deflected beams, impinge on the light modulator device 3 parallel with or at a defined angle to an optical axis OA of the scanning system AS, where the distance between the beams and the optical axis OA differs depending on which one-dimensional arrangement of modulation elements 4 on the light modulator device 3 is being scanned. The imaging element 9 (=9') does not contribute to the imaging, because it is optically ineffective in the non-coherent direction. This is why the imaging element 9 (=9') is not shown in FIG. 2b. The beams modulated by the light modulator device 3 are reshaped by the lens elements 10b and 10c into parallel bundles of rays, which always pass through the plane 12 at the same position, but at different angles, depending on the selected line or column. The light modulator device 3 is disposed in the object-side focal plane of the imaging means 10, and the plane 12 coincides with the image-side focal plane of the imaging means 10. Consequently, the scanning element 5 is imaged into the plane 12. The light emitted by the light source 2 is of course also directed through the plane 11 to the light modulator device 3 and then through the plane 11' to the plane 12 in the non-coherent direction. This means that the beams on the way to or from the light modulator device 3 are deflected if at least one deflection element is disposed in plane 11 (=11'). With a transmissive light modulator device 3, it is also possible to provide at least one deflection element in plane 11 and/or plane 11'. Further, the imaging element 7 may be disposed such that the first imaging of beams in the non-coherent direction in plane 12 is created virtually. This means that plane 12 is disposed in front of the lens element 7b of the imaging element 7, seen in the direction of light propagation, preferably such that the beams impinge on to the scanning element 5 as collimated beams. Moreover, the imaging elements 6 and/or 7, which is/are disposed between the light source 2 and the scanning element 5, may be omitted, if the light source 2 is designed such that the emitted beams already conform with the required properties, e.g. as regards aperture width.

Figure 3:
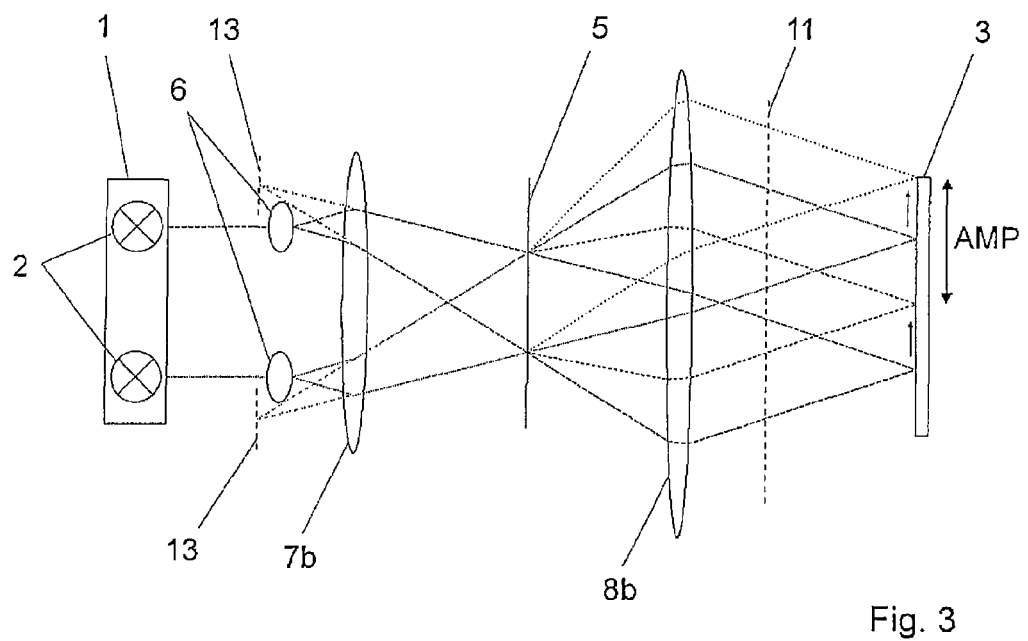
FIG. 3 shows a detail of the scanning system according to the invention which illustrates the illumination of the two-dimensional light modulator device with multiple light sources.

FIG. 3 shows a detail of the scanning system AS described with respect to FIGS. 2a and 2b which illustrates a method of illuminating the light modulator device 3. The illumination device 1 may also comprise multiple light sources 2. In this embodiment, two light sources 2 are shown in conjunction with two imaging elements 6, where the light sources 2 and the imaging elements 6 are disposed at a lateral distance to the optical axis. The light beams emitted by the light sources 2 are broadened by the two imaging elements 6 and imaged by the lens element 7b of the imaging means 7 into a plane 13. These images of the light sources are virtual. The light impinging on the scanning element 5 is deflected by it and impinges on to the light modulator device 3. If an illumination device 1 comprises two light sources, and if the light modulator device 3 is scanned line-wise, one light source 2 illuminates for example an upper section and the other light source 2 a lower section of the light modulator device 3 at the same time and with the help of the same scanning element 5. This means that each light source 2 only scans a part of the light modulator device 3. With defined amplitudes AMP of the deflection of the scanning element 5, the scans of the light sources 2 can be complementary. Consequently, each light source 2 only scans the part of the light modulator device 3 which is not scanned by the other light source 2. If the light modulator device 3 is scanned column-wise, the light sources 2 must be disposed vertically. If multiple light sources 2 are used, it is important to ensure that the light sources 2 are not coherent with respect to each other, so as to avoid the occurrence of undesired interferences. This type of illumination may for example be useful to compensate for a slow scanning element or to improve brightness.

Figure 4A:
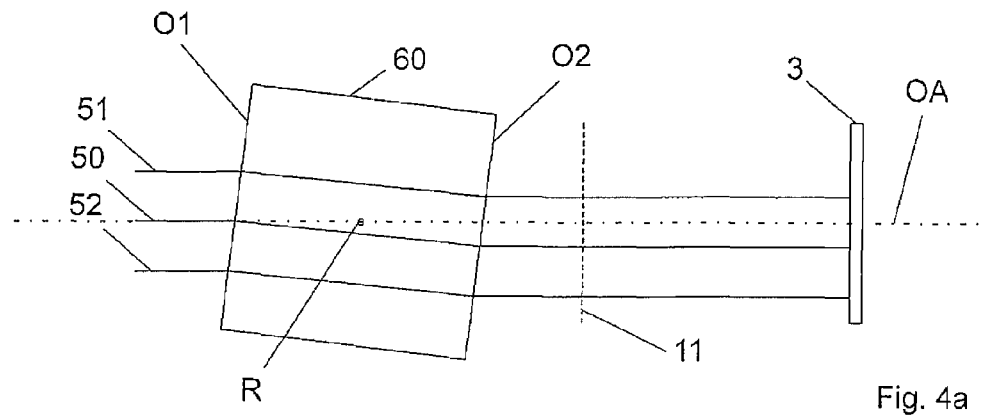
FIGS. 4a to 4c show details of the scanning system according to the invention which illustrate how the light modulator device is scanned by a rotating scanning element.
Figure 4B:
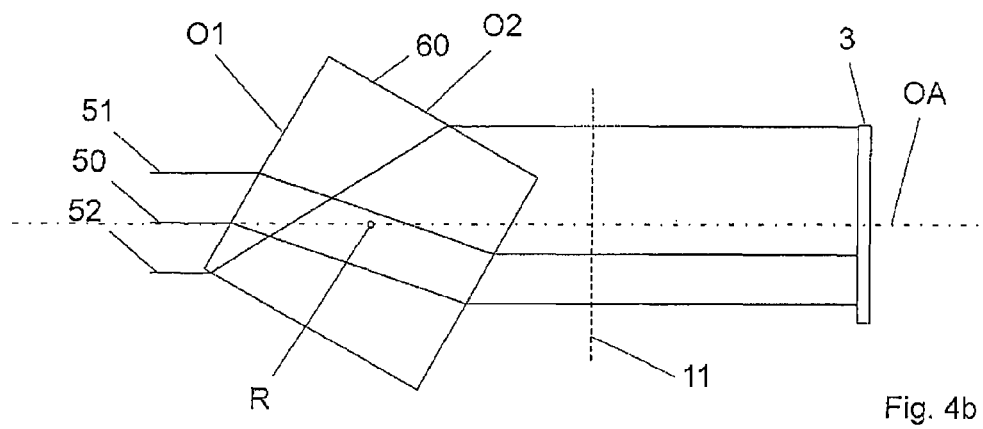
Figure 4C:
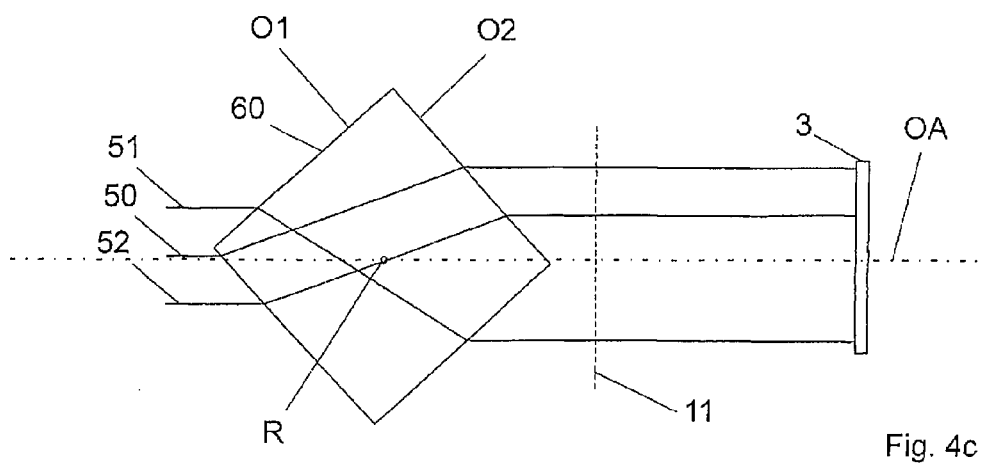

The scanning element 5 can of course also be a scanning prism. FIGS. 4a, 4b and 4c show side views of such an alternative scanning element 60 used to scan a line-wise arrangement of modulation elements 4. Reference numeral 3 again denotes the light modulator device, and the scanning element 60 is disposed in front of the light modulator device 3, seen in the direction of light propagation. The scanning element 60 is preferably of a square or rectangular shape and has a rotation axis R. The scanning element 60 rotates around the rotation axis such that the incident light, here indicated through the light beams 50, 51 and 52, after its passage through the scanning element 60 is offset parallel to the optical axis OA of the scanning system AS. If the light beams 50, 51 and 52 impinge on a surface O1 of the scanning element 60 at a right angle, they can pass without any diffraction. When scanning the one-dimensional arrangements of modulation elements 4 of the light modulator device 3, it is therefore important to ensure that two parallel surfaces of the scanning element 60, e.g. O1 and O2, are disposed at an angle to the optical path. It is of course not always necessary for the scanning element 60 to be tilted during the scanning process. FIGS. 4a, 4b and 4c show the scanning element 60 in different rotation states. After having scanned the last line of the light modulator device 3 (see FIG. 4a), the light beam 52, for example, scans the first line (i.e. arrangement of modulation elements 4) of the light modulator device 3 (see FIG. 4b) because of the rotation of the scanning element 60. Then, the second line (FIG. 4c) and all subsequent lines are scanned because of the rotation of the scanning element 60. Such an element is known for example from U.S. Pat. No. 5,532,763, wherein, however, the element is only used for colour reproduction.

The imaging elements 6, 7 and, optionally, 8, which are disposed between the illumination device 1 and the scanning element 60, reshape the light beams 50, 51 and 52 such that they are focussed on the light modulator device 3. The scanning element 60 must be disposed in front of plane 11. If a transmissive light modulator device 3 is used, the scanning element 60 can be disposed either in front of or behind plane 11, or even in plane 11.

Figure 5:
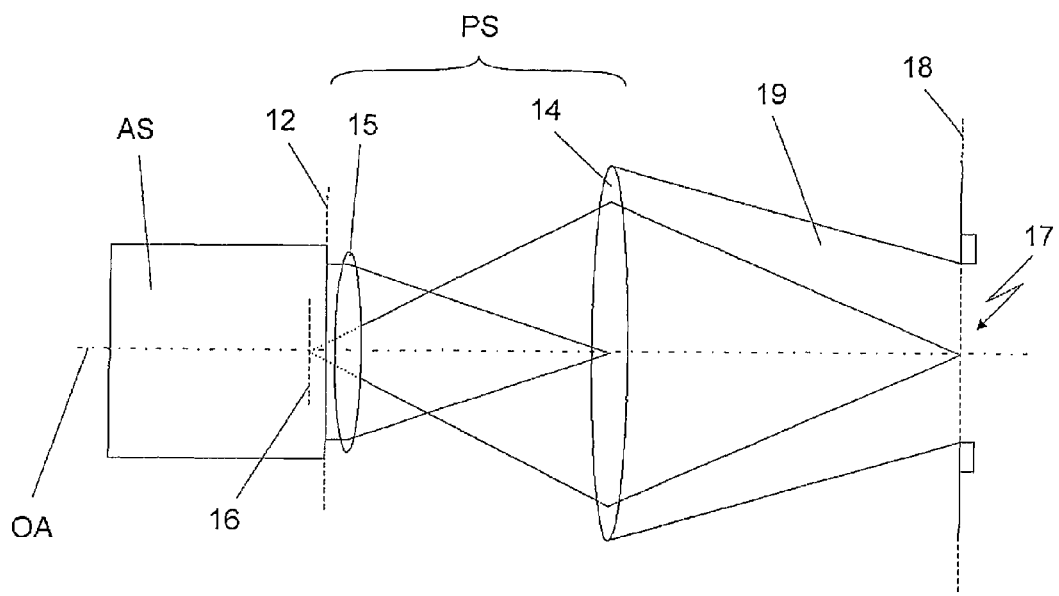
FIG. 5 shows schematically a holographic projection device according to the invention with a scanning system according to FIGS. 2a and 2b and a projection system.

FIG. 5 shows the holographic projection device as a whole. As already mentioned briefly above, the holographic projection device comprises the scanning system AS, only shown schematically here, and a projection system PS. This scanning system AS is disposed in front of the projection system PS, seen in the direction of light propagation. It comprises the illumination device 1, at least one light modulator device 3, the scanning element 5 or 60 and imaging elements, e.g. according to FIGS. 2a and 2b the imaging elements 6, 7, 8, 9 (=9') and 10. The projection system PS comprises an optical element 14 which serves as a screen and at least one imaging means 15. The optical element 14 can for example be a mirror, lens or diffractive optical element. It will be referred to as a "screen" below. The screen 14 is disposed in the image-side focal plane of the imaging means 15. The imaging means 15 can be a lens, DOE, lens arrangement or similar optical element, in particular an arrangement of spherical and cylindrical lenses, so that preferably different degrees of magnification will be achieved in the coherent and non-coherent direction.

In the coherent direction, the modulated wave front WF, which is imaged into plane 12, is subsequently imaged in the projection system PS by the imaging means 15 into a plane 16, in which a virtual image of the wave front WF is created according to this embodiment. This image of the wave front WF is then imaged through the screen 14 into a virtual observer window 17, which does not exist physically, and which is located in an observer plane 18. At the same time, the Fourier transform FT of the modulated wave front WF, which is created in plane 11' in the scanning system AS, is imaged by the imaging element 10 and imaging means 15 on to the screen 14. In the non-coherent direction, the beams which impinge into plane 12 in a collimated manner are imaged by the imaging means 15 on to the screen 14. In addition, the scanning element 5, which is imaged into plane 12, is imaged by the imaging means 15 and the screen 14 into the virtual observer window 17. This means that the observer window 17 is disposed in an image plane of a system which comprises the imaging element 10, imaging means 15 and screen 14 in the non-coherent direction.

It is advantageous if the screen 14 is disposed in the image-side focal plane of the imaging means 15, because thereby the periodic continuation of the diffraction orders is displaced out of the screen 14, so that only one period of the diffraction spectrum is visible on the screen 14. This means that an observer does not perceive the periodic continuation of the reconstruction in the various diffraction orders.

Further, it is advantageous if the light emitted by the light source 2 impinges areally on plane 12, whereby the observer window 17 and thus a reconstruction volume 19 can be enlarged in the non-coherent direction. This means that the wider the wave front incident on plane 12 in the non-coherent direction, the larger is the observer window 17. It is thus advantageous if the focal length of the lens element 10b of the imaging element 10 is greater than the focal length of the lens element 8b of the imaging element 8, in order to enlarge the observer window 17.

The modulated wave fronts WF overlap in the observer window 17 one after another, and the Fourier transforms FT of the sequentially scanned one-dimensional arrangements of modulation elements 4 are imaged to different positions on the screen 14. The wave fronts WF are thus sequentially imaged to the observer window 17. An observer who is situated in the observer plane 18 and who looks through the virtual observer window 17 can see a reconstructed, preferably three-dimensional scene, which is reconstructed in front of, on or behind the screen 14, in the reconstruction volume 19, which stretches as a frustum between the observer window 17 and the screen 14.

In this embodiment, the observer window 17 is at least as large as the eye separation of an observer. A second light modulator device 3 of the same type for a second observer eye and a corresponding adaptation of the entire projection device is thus not required. Alternatively, the observer window 17 may be smaller, but then at least a second scanning system AS must be provided for the second observer eye. If this is the case, the scanning systems AS can be arranged in parallel next to each other, or at an angle to each other. If the scanning systems AS are arranged in parallel, only one imaging means 15 will be required for the two scanning systems AS. If the scanning systems AS are arranged at an angle, two imaging means 15 are required for the two optical paths of two light channels.

Diffusing elements, such as diffuser foils or similar elements, may additionally be disposed in a plane which is imaged on to the screen 14, in order to enlarge the observer window 17 in the non-coherent direction.

In order to be able to reconstruct the scene in colour, a beam splitter may be disposed between the plane 12 and the imaging means 15, for example.

Figure 6A:
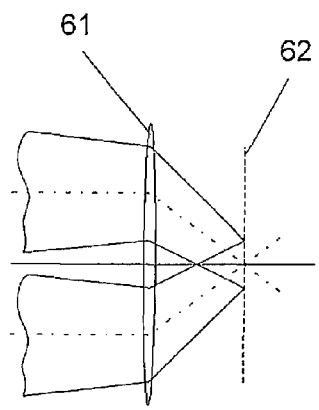
FIGS. 6a to 6e show details of the projection system and illustrate an overlapping of two light channels with at least one projection means.

FIG. 6a is a top view that shows an enlarged detail of the projection system PS and illustrates how two light channels are simultaneously imaged to serve a pair of eyes of an observer. The two light channels are arranged in parallel next to each other, and the modulated wave fronts of the two light channels are superimposed in a plane 62, which is the focal plane of the imaging means 61, with the help of a single imaging means 61 for the two light channels. This means that in front of the imaging means 61, seen in the direction of light propagation, the modulated wave fronts are imaged to infinity. The screen 14 can for example be disposed in plane 62, otherwise this plane 62 must be imaged on to the screen 14.

If this device is used in conjunction with the projection device shown in FIG. 5, the two scanning systems AS provided are arranged such that their corresponding light channels are disposed in parallel next to each other. The imaging means 61 replaces in this case the imaging means 15, and the screen 14 is disposed in the focal plane 62 of the imaging means 61.

Figure 6B:
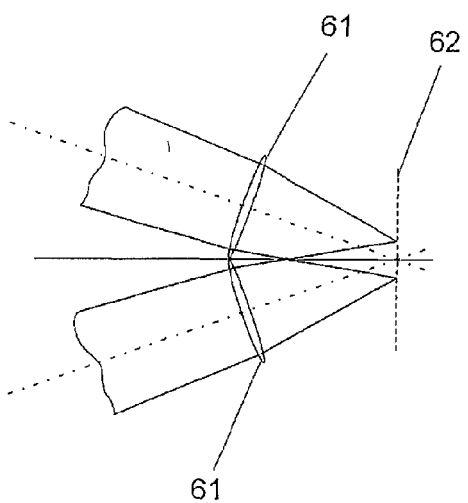

FIG. 6b also shows a detail of the projection system PS, and illustrates how two light channels are imaged simultaneously. In contrast to the previous Figure, the light channels are not arranged in parallel, but at an angle. This is why there are two imaging means 61, one for each light channel, to guide the wave fronts into the plane 62.

Figures 6C, 6D, 6E:
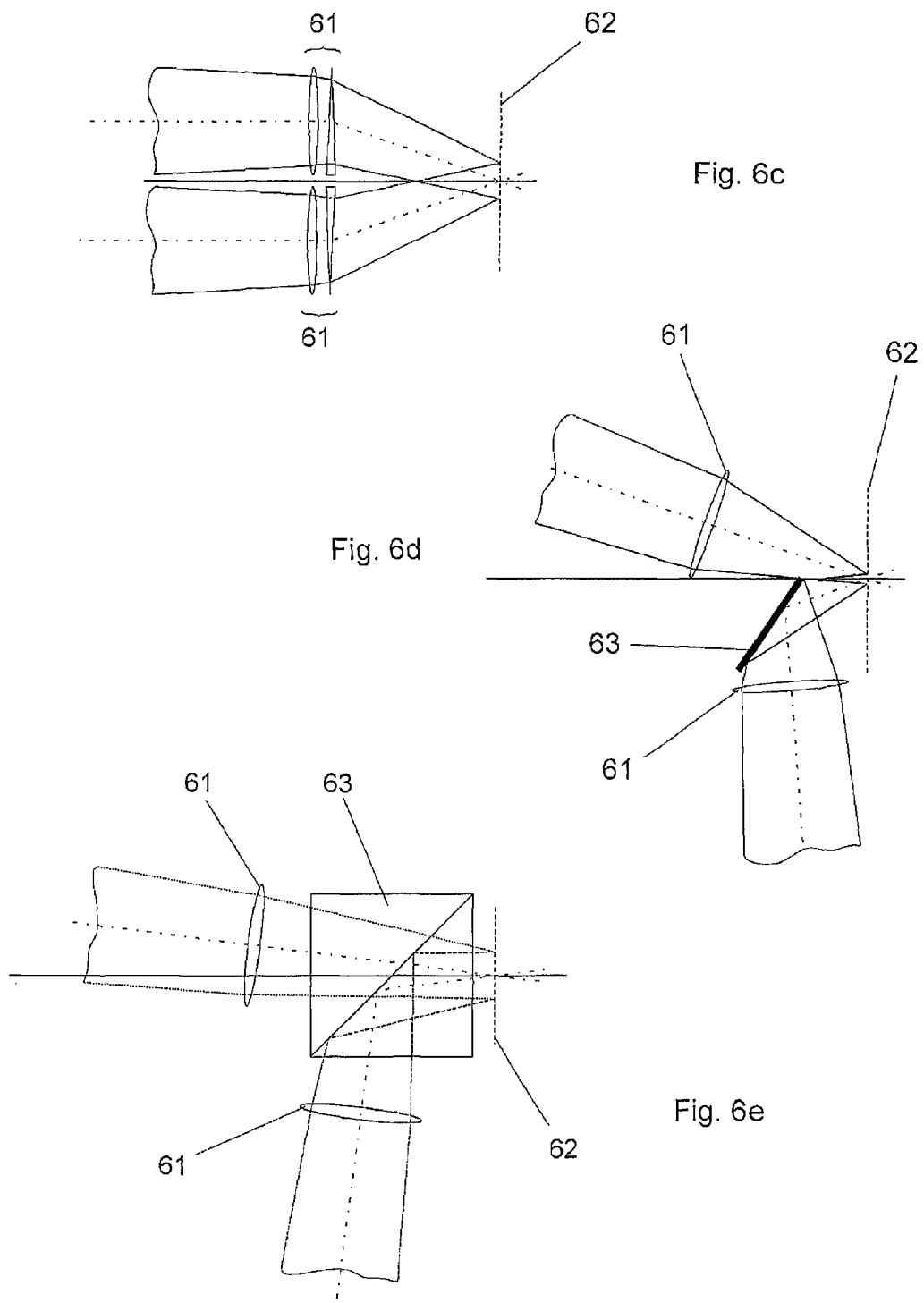

FIG. 6c shows another detail of the projection system PS. The two light channels which serve a pair of eyes are arranged in parallel, as shown in FIG. 6a. However, according to this embodiment, the two imaging means 61 comprise two optical elements each, namely a lens and a prism. It is of course also possible to combine these two optical elements.

Other possibilities of beam passage through the projection system PS, which are similar to the options shown in FIGS. 6b and 6c, are illustrated in FIGS. 6d and 6e.

FIG. 6d shows the two light channels which serve a pair of eyes, where the wave front of a first light channel is modified directly by the imaging means 61 and the wave front of a second light channel is additionally deflected by a deflection element 63, such as a mirror. This possibility is particularly advantageous if a mechanical holding bracket for two imaging means 61 arranged next to each other would be too large and too difficult to construct. Further, as shown in FIG. 6e, it is advantageous to use a beam splitter element instead of a mirror as the deflection element 63. It would be easier to integrate such a deflection element. Again, two imaging means 61 are provided, which are disposed in front of the beam splitter element 63, seen in the direction of light propagation. By using a beam splitter element 63, a sufficient overlapping of the two light channels can be achieved on the screen 14.

Figure 7:
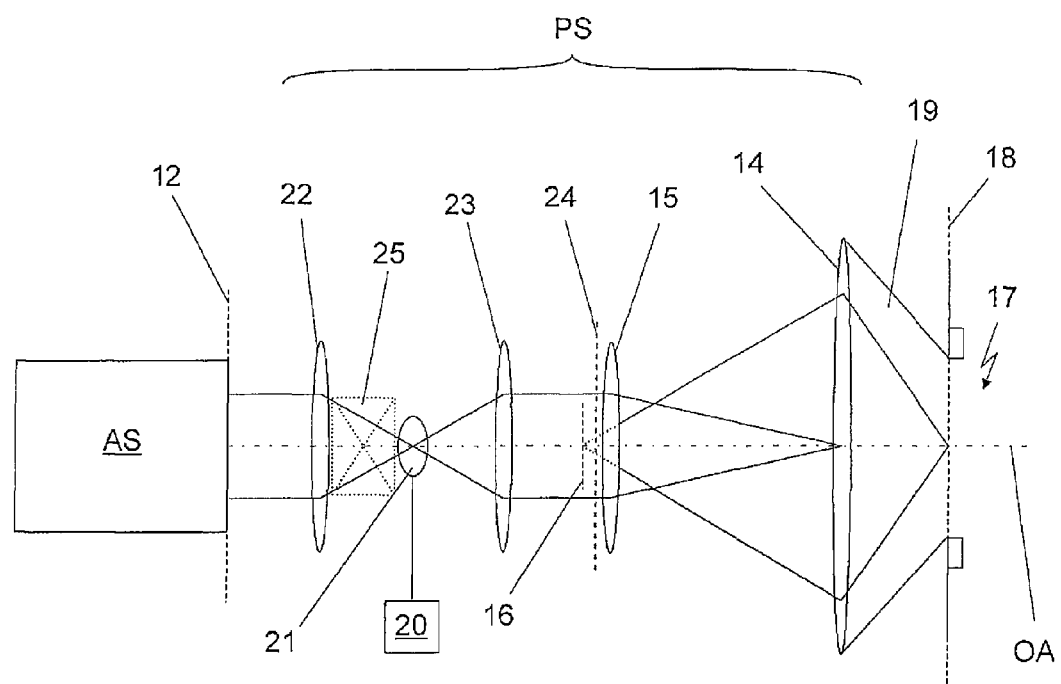
FIG. 7 shows the holographic projection device according to the invention with a deflection element for tracking a virtual observer window.

FIG. 7 shows schematically the functional principle of the holographic projection device. The projection system PS includes a position detection system 20 for detecting the eye positions of at least one observer in the observer plane 18 when viewing a reconstructed scene and for tracking the observer window(s) 17 accordingly. The scanning system AS is only indicated schematically in this Figure. The position detection system 20 can, for example, be a camera in conjunction with a deflection element 21 which is provided for tracking the virtual observer window 17 in the observer plane 18 in accordance with changes in the observer's eye positions. The deflection element 21 is thereby disposed between two imaging means 22 and 23. The imaging means 22 and 23 represent an afocal system, where the deflection element 21 is disposed in the image-side focal point of the imaging means 22, which is at the same time the object-side focal point of the imaging means 23. The deflection element 21 can be discretely controlled and is preferably a mirror element. A very precisely working deflection element is required for proper tracking of the observer window 17. This is why the deflection element 21 can be a galvanometer scanner, for example. Of course, it is also possible to use other deflection elements, such as MEMS arrays, polygon scanners or an acousto-optic arrangement. Further, the deflection element 21 can deflect in at least one, i.e. horizontal and/or vertical direction. This means that in the case of one-dimensional scanning of the light modulator device 3, the deflection element 21 only tracks the observer window 17 in either horizontal or vertical direction. A wave front, which contains the information required to reconstruct a three-dimensional scene, is generated in the scanning system AS, as described with respect to FIGS. 2a and 2b. This is why only the reconstruction in the projection system PS will be described with this embodiment. The afocal system, represented by the imaging means 22 and 23, images the plane 12 through the deflection element 21 into a plane 24. This plane 24 is then imaged into plane 16 in order to be imaged into the observer window 17 in the observer plane 18. At the same time, the deflection element 21 is imaged by the imaging means 23 and 15 on to the screen 14. The deflection element 21 is disposed in the focal plane of the imaging means 22. In the coherent direction, the modulated wave front WF is imaged into plane 12 in the scanning system AS, and is then imaged into the virtual observer window 17 on to at least one observer eye. The Fourier transform FT of the modulated wave front is at the same time imaged from plane 12 to infinity. The Fourier transform FT is then imaged by the imaging means 22 on to the deflection element 21. In the non-coherent direction, the scanning element 5 is imaged into plane 12 in the scanning system AS, and the beams are imaged or collimated to infinity once they have passed the imaging element 10. The scanning element 5 is then imaged into the observer window 17. At the same time, the beams are focussed on the deflection element 21 and imaged by the imaging means 23 and 15 on to the screen 14.

The imaging means 23 and 15 can also be combined so as to form one single lens or lens array. The above holographic projection device was only described for one observer eye; however, it can also be designed for a pair of observer eyes if the observer window 17 is large enough. Alternatively, a pair of observer eyes can also be served by a second light modulator device 3 for a second observer eye, then a number of modifications must be applied to the projection device. If the systems according to FIGS. 6a to 6e are applied to the projection device shown in FIG. 7, the imaging means 61 corresponds with the imaging means 22, and the plane 62 corresponds with the plane in which the deflection element 21 is disposed. According to a first variant of this embodiment of the holographic projection device, the two scanning systems AS are disposed at an angle to each other. This is why two imaging means 22, one for each scanning system AS, are disposed in front of the deflection element 21 in the projection system PS in that case. The imaging means 23 and 15 and the screen 14 are used typically. According to a second variant of this embodiment, the two scanning systems AS are arranged in parallel, so that the imaging means 22, 23, 15 and the screen 14 are used typically. Of course, this is not a necessary prerequisite. The latter variant of the projection device exhibits the disadvantage that it is more susceptible to aberrations compared with the former variant. If the observer is situated in the observer plane 18 and looks through the observer window 17, he can see the reconstructed three-dimensional scene in the reconstruction volume 19, where the scene is reconstructed in front of, on or behind the screen 14, seen in the direction of light propagation.

Colour reconstruction of the three-dimensional scene is also possible with the help of the holographic projection device, as already noted above. For this, at least one beam splitter element 25, preferably a prism block, is disposed in front of the deflection means 21, seen in the direction of light propagation. Alternatively, the beam splitter element 25 may be disposed at any other suitable position in the projection device. Colour reconstruction of the scene is thereby achieved by simultaneously processing the three primary colours, RGB. If two fully separated light channels are provided, two beam splitter elements 25, i.e. one beam splitter element 25 per light channel, can be disposed in the projection system PS. The beam splitter element 25, which is preferably an X prism with dichroic layers, splits red, green and blue light into three separate wave fronts or recombines them to form a common modulated wave front. Colour reconstruction of the scene is achieved using three scanning systems AS per light channel, where each scanning system comprises a monochromatic light source 2. The optical elements of the scanning systems AS can preferably be optimised such as to be suited to the corresponding monochromatic light colour.

It is of course also possible to use a different optical element for colour reconstruction, such as the scanning element already mentioned above, which is in this case a scanning prism. Here, it is preferably designed to be of square or rectangular shape. This scanning prism for colour reconstruction is designed and functions as already described above. For colour reconstruction, the light beams 50, 51 and 52 emitted by three individual light sources 2 of the illumination device 1, or by one single light source 2 which exhibits sufficient coherence in each of the primary colours. The individual monochromatic waves are diverged with the help of a dichroic beam splitter system. The imaging elements 6 and 7 can either be used commonly for the three primary colours, or they can be provided three times, so that each channel has separate imaging means 6 and 7 for each primary colour.

Alternatively, sequential colour reconstruction of the scene is possible as well. To perform this type of reconstruction, a preferably coloured light source 2, which exhibits sufficient coherence, and a switching system are required in order to control the monochromatic primary colours, RBG, sequentially. This allows the colour reconstructions to be generated one after another. It is of course also possible when performing a monochromatic or sequential colour reconstruction of scenes to use only one scanning prism, and only one of the light beams 50, 51 or 52.

Figure 8:
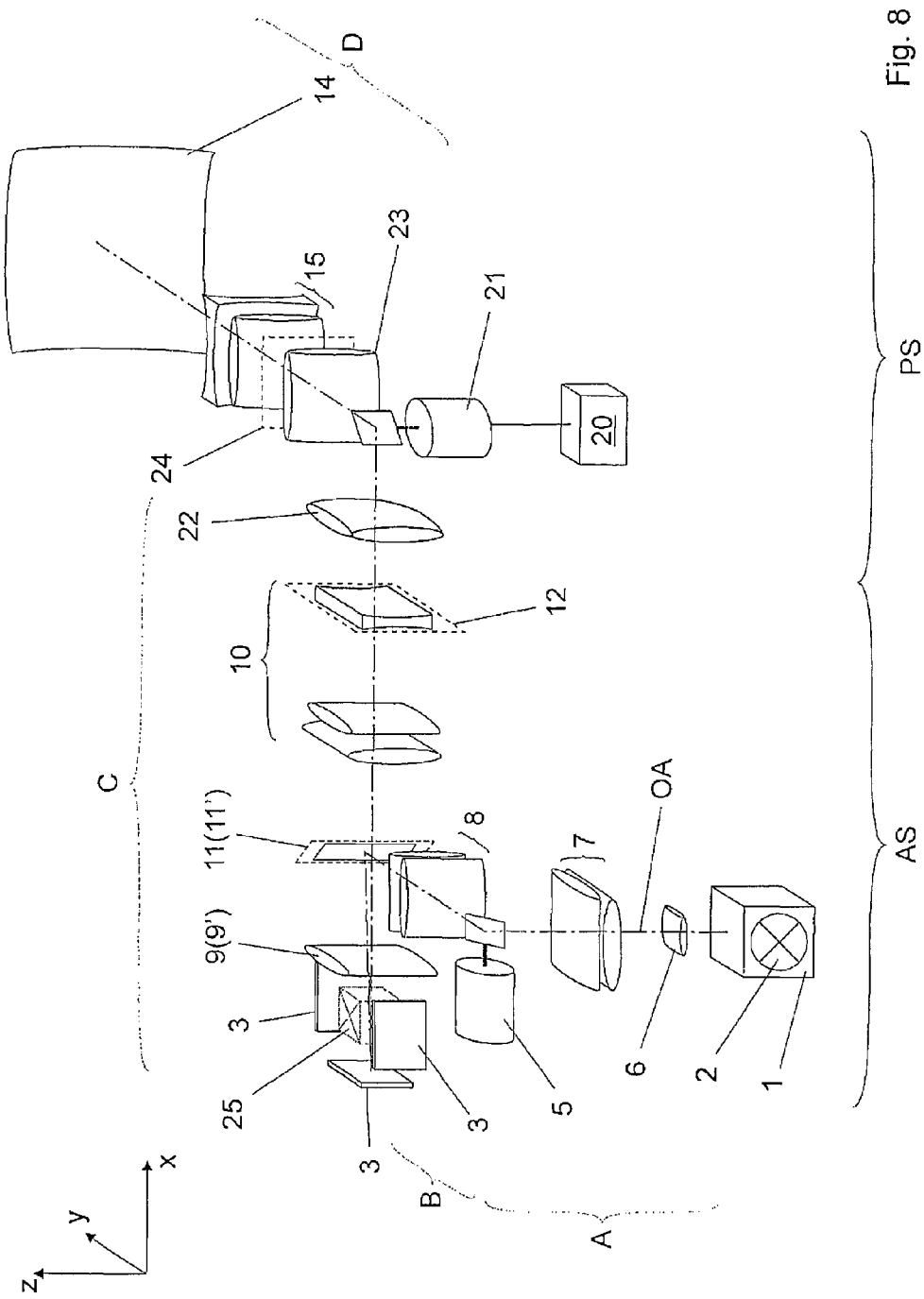
FIG. 8 shows a perspective view of the holographic projection device according to the invention and illustrates the division into a scanning system and a projection system.

FIG. 8 is a perspective view of the holographic projection device shown in FIG. 7 as a whole. As already mentioned above, the projection device comprises a scanning system AS and a projection system PS. The projection device has been divided into four sections, A, B, C and D, which helps to explain both the coherent and non-coherent direction in accordance with the coordinate system indicated in the top left corner of the Figure. In section A, the coherent direction corresponds with the x coordinate, and the non-coherent direction corresponds with the y coordinate. The z coordinate represents the direction of light propagation. In section B, the coherent direction again corresponds with the x coordinate, but the non-coherent direction corresponds with the z coordinate. The direction of light propagation is represented by the z coordinate. In section C, the coherent direction corresponds with the y coordinate, and the non-coherent direction corresponds with the z coordinate. The light propagates along the x coordinate. Finally, in section D, the coherent direction corresponds with the x coordinate, and the non-coherent direction corresponds with the z coordinate. The y coordinate represents the direction of light propagation. As can be seen clearly in this perspective view of the projection device, the projection device is anamorphic. The imaging elements 7, 8, 9 (=9') and 10 comprise at least one anamorphic, preferably cylindrical, element, where according to this embodiment each of the imaging elements 7, 8 and 10 comprise two lens elements, or a single lens element which exhibits different major planes and focal lengths in the coherent and non-coherent directions. Moreover, the imaging element 9 (=9') only exhibits an optical imaging effect in the coherent direction. The virtual observer window 17 can for example be disposed behind the screen 14 or, if the screen 14 is of a reflective type, beside it or in front of it. The observer window 17 is thus not shown in this Figure.

FIGS. 9*a* and 9*b* show the scanning system AS in a simplified manner. FIG. 9*a* shows the optical path in the coherent direction and FIG. 9*b* shows the optical path in the non-coherent direction. In this embodiment, the scanning system AS again comprises the illumination device 1 with the light source 2, the scanning element 5, the light modulator device 3 and imaging elements 6, 7, 8, 9 (=9') and 10. The lens elements 7*b* and 10*c* of the imaging elements 7 and 10 are omitted in this embodiment. In this embodiment of the holographic projection device, the imaging element 6 also exhibits its imaging effect in one direction only. The imaging elements 6, 7, 8, 9 (=9') and 10 can be of the same type as described with respect to FIGS. 2*a* and 2*b* above. The functional principle of the scanning system AS in the coherent direction is almost the same as described with respect to FIG. 2*a*. The modulated wave front WF is imaged through the imaging elements 9' (=9) and 10 into plane 12, and its Fourier transform FT is created at plane 11'.

In the non-coherent direction, the imaging elements 6 and 7 do not exhibit any optical effects, so that the beams emitted by the light source 2 impinge directly on the scanning element 5. The light source 2 in this embodiment is designed such that the emitted beams are sufficiently narrow in the non-coherent direction, so that it is not necessary for the imaging elements 6 and 7 to have optical imaging effects in that direction. The functional principle of the scanning system AS is explained below. Here, three linear arrangements of modulation elements 4 on the light modulator device 3 are scanned one after another, these three scans being represented by different lines in the Figure. The beams which are emitted by the light source 2 are directed on to the scanning element 5. Then, the beams pass the lens element 8*b* and the plane 11 and impinge on the light modulator device 3 at different positions, but with parallel optical axes, because the scanning element 5 is disposed in the focal plane of the lens element 8*b* of the imaging means 8. The imaging element 9 (=9') does not contribute to the imaging, because it is optically ineffective in the non-coherent direction. This is why the imaging element 9 (=9') is not shown in FIG. 9*b*. The beams modulated by the light modulator device 3 pass the lens element 10*b* and impinge on plane 12 at the same point, but under different angles. The plane 12 coincides with the focal plane of the lens element 10*b*. The scanning element 5 is imaged by the lens elements 8*b* and 10*b* into the plane 12.

Figure 10:
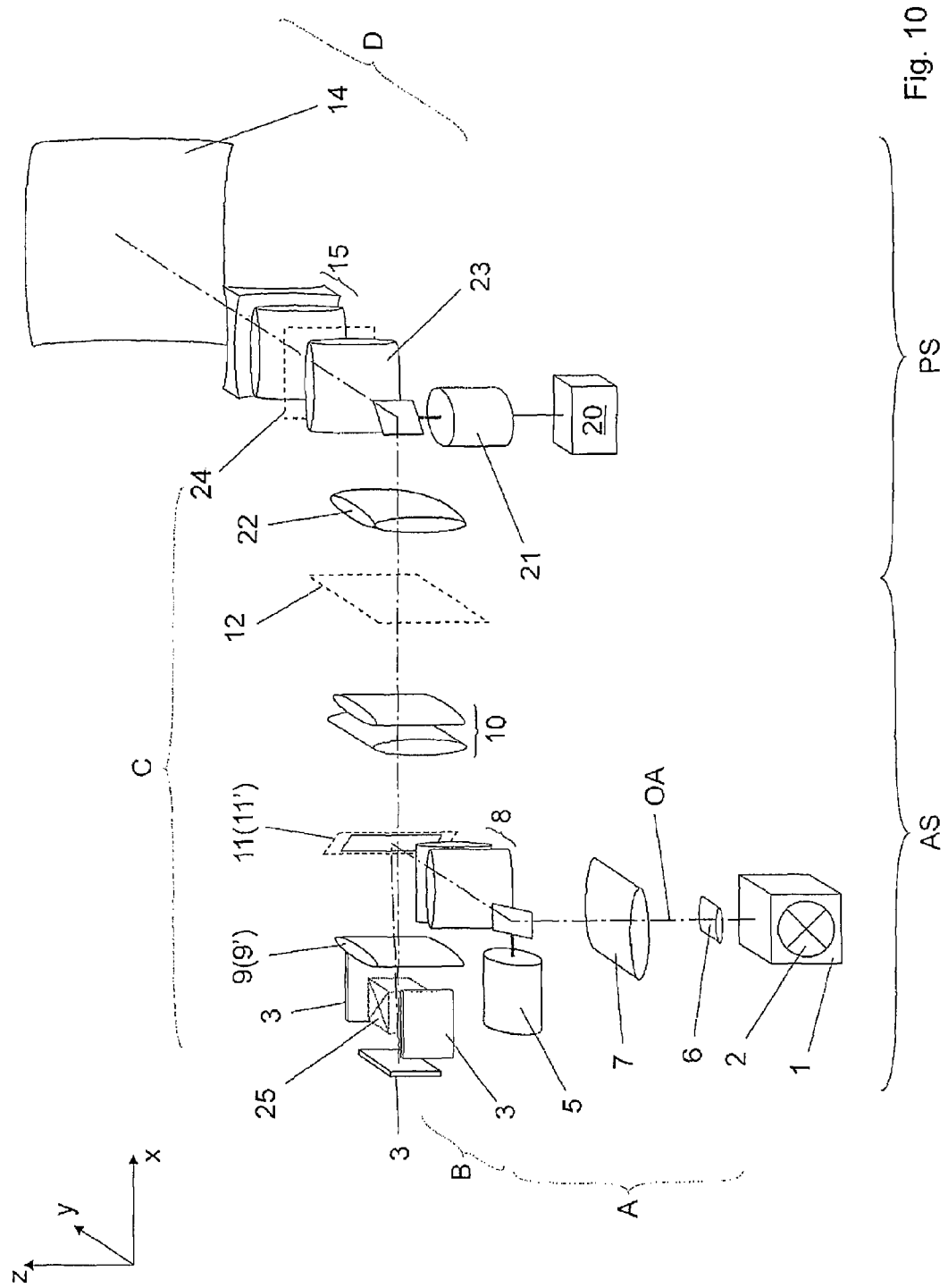
FIG. 10 is a perspective view of the simplified holographic projection device shown in FIGS. 9a and 9b.

FIG. 10 is a simplified perspective view of the entire holographic projection device. The scanning system AS and projection system PS are indicated by curly brackets. The coordinate system is used again to indicate the coherent and non-coherent directions, as described with respect to FIG. 8. A wave front, which contains the information required to reconstruct a three-dimensional scene, is generated in the scanning system AS, as described with respect to FIGS. 9*a* and 9*b*. This is why only the projection system PS is described for both the coherent and non-coherent direction here. In the coherent direction, the modulated wave front WF is imaged through the scanning system AS into plane 12. The wave front WF is then imaged by the imaging means 22 and 23 into plane 24, which is situated in front of the imaging means 15. From this plane 24, the wave front is imaged through the imaging means 15 and the screen 14 into the virtual observer window 17 and on to at least one observer eye. At the same time, the Fourier transform FT is imaged by the imaging means 22 on to the deflection element 21, and from there by the imaging means 23 and 15 on to the screen 14. In the non-coherent direction, the scanning element 5 is imaged through the scanning system AS into plane 12, where the scanning element 5 is imaged to infinity, once the imaging has passed the imaging element 10. The imaging means 22 and 23 then image the scanning element 5 into the plane 24, which is situated in front of the imaging means 15. From plane 24 the scanning element 5 is imaged by the imaging means 15 and through the screen 14 into the observer window 17. At the same time, the beams in the non-coherent direction are imaged on to the deflection element 21 and then by the imaging means 23 and 15 on to the screen 14.

The holographic projection device described above was described for one observer eye only. However, it is possible to provide an observer window which is large enough for both observer eyes. Alternatively, it is possible to provide a second light modulator device 3 to serve a pair of observer eyes. The construction of such an arrangement with two scanning systems AS can be as already described above. If the observer is situated in the observer plane 18 (not shown) and looks through the observer window 17, he can see the reconstructed three-dimensional scene in the reconstruction volume 19, where the scene is reconstructed in front of, on or behind the screen 14, seen in the direction of light propagation. Again, the position detection system 20 is provided in order to detect the position of the observer eyes and to track the observer window 17 accordingly. Further, it can now be seen clearly that the holographic projection device is simplified in the non-coherent direction, as the lens element 10*c* in plane 12 is omitted and the imaging means 6 and 7 are designed much more simply. This construction further facilitates an alignment of the optical elements.

FIGS. 11*a* and 11*b* show the functional principle of the holographic projection device again in a simplified, very compact form. FIG. 11*a* is a top view which shows the projection device in the coherent direction, and FIG. 11 *b* is a side view which shows the projection device in the non-coherent direction. The scanning system AS is very simple in this embodiment. The imaging means 15 comprises three lens elements 15*a*, 15*b* and 15*c*. The lens element 15*a* is only optically effective in the coherent direction, whereas the lens elements 15*b* and 15*c* are only optically effective in the non-coherent direction. According to this embodiment, the scanning system AS comprises the illumination device 1 with the light source 2, the scanning element 5, the light modulator device 3 and imaging elements 6, 7 and 8. The projection system PS only comprises the deflection element 21, the imaging means 15 and the screen 14. If the light modulator device 3 is of a transmissive type, the imaging element 9 is a combination of the imaging elements 8 (8*a*, 8*b*) and 9, and the imaging element 9' is a combination of the imaging elements 9' and 10 and the imaging means 22. In the case a reflective light modulator device 3 is used, as shown in the Figure, the imaging element 9 corresponds with the imaging element 9'. The imaging means 15 is a combination of the imaging means 23 and 15. The optical properties (e.g. major planes, focal lengths etc.) of this new imaging element 9 (=9'), and of the imaging means 15, must be optically effective in both the coherent and non-coherent direction. The individual optical elements can again be of the same type and design as described with respect to FIGS. 2a and 2b. The functional principle of the holographic projection device in the coherent direction is almost the same as described with respect to FIG. 2a. The light source 2 of the illumination device 1 emits sufficiently coherent light in the form of a wave W, preferably with a plane wave front, which is directed on to the imaging element 6 for broadening. The wave W then passes through the imaging element 7 and impinges on to the scanning element 5. The scanning element 5 deflects the wave W depending on which arrangement of modulation elements 4 of the light modulator device 3 is to be scanned. It is preferably used at the same time to fold the optical path. The scanning element 5 is disposed in the object-side focal plane of the imaging element 9. The wave W is then collimated and impinges on to the light modulator device 3 by the imaging element 9. The wave front WF modulated by the light modulator device 3 is then imaged by the imaging element 9', the lens element 15a and the screen 14 into the observer window 17 in the observer plane 18. After modulation of the wave W, the imaging element 9' creates its Fourier transform FT in the image-side focal plane of the imaging element 9', i.e. on the deflection element 21, which is also preferably used to fold the optical path. This Fourier transform FT is then imaged by the lens element 15a on to the screen 14. The lens elements 15b and 15c do not exhibit optical effects in this direction, which is why they are omitted in this Figure. Referring to this Figure, there is an observer in the observer plane 18, who looks through the observer window 17 with both eyes. The dotted line, indicating the propagation of the wave front WF, represents the wave which is created if the observer changes his position in the observer plane 18. This new position of the observer in the observer plane 18 is indicated in the Figure with dotted lines as well. The deflection element 21 tracks the observer window 17 according to changes in the position of the observer eyes.

Referring to FIG. 11b, the functional principle in the non-coherent direction is explained below. Here, the scanning of two linear arrangements of modulation elements 4 on the light modulator device 3 is shown. The two scans are performed one after another. The beams which are emitted by the light source 2 are broadened by the imaging element 6 and impinge through the imaging element 7 on to the scanning element 5 in the form of parallel bundles of rays. From the scanning element, the beams are focussed by the imaging element 9 on to the light modulator device 3, which is disposed in the image-side focal plane of the imaging element 9, where they scan a one-dimensional arrangement of modulation elements 4, thus modulating the beams. The beams thus modulated by the light modulator device 3 impinge in a collimated manner through the imaging element 9' on to the deflection element 21, because the light modulator device 3 is of a reflective type. The collimated beams are then focussed into a plane M, which is disposed in an image-side focal point of the lens element 15b. The lens element 15a is preferably disposed in the plane M, where the extent of the beams in the non-coherent direction is small. These beams are then imaged by the lens element 15c on to the screen 14. At the same time, the scanning element 5 is imaged by the imaging element 9 (=9') through the light modulator device 3 and on to the deflection element 21, from where it is imaged by the imaging means 15 and the screen 14 into the observer window 17. In a special variant of the projection device shown in this Figure, the scanning element 5, which is imaged on the deflection element 21, can be imaged by the lens element 15b into its focal plane, in which the lens element 15c is disposed here, and then through the screen 14 into the observer window 17. It is thereby not necessary that the lens element 15c is disposed in the imaging point of the scanning element 5. However, this would be preferable though, because the extent of the beams is limited in this plane.

Moreover, the imaging element 6, which is disposed between the light source 2 and the imaging element 7, or both imaging elements 6 and 7, may be omitted, if the light source 2 is designed such that the emitted beams already conform with the required properties, e.g. as regards aperture width. In order to reconstruct a scene in colour, a beam splitter element can be disposed between the reflective light modulator device 3 and the imaging element 9 (=9'), and three light modulator devices 3 are provided for simultaneous colour reconstruction. For sequential colour reconstruction, only one scanning system AS must be provided, because the light source 2 emits the required monochromatic wave fronts in the three primary colours one after another.

Figure 12:
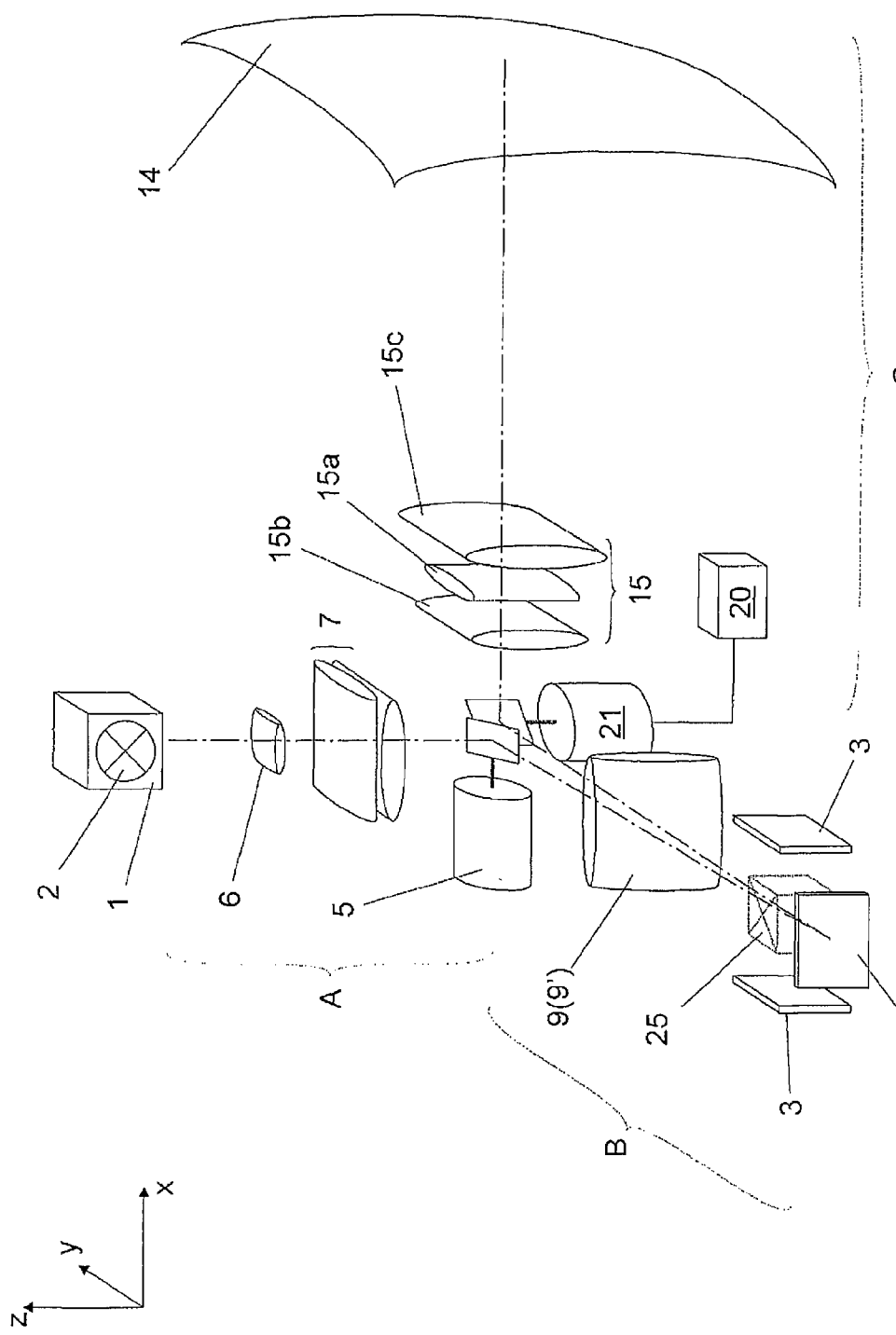
FIG. 12 is a perspective view of the holographic projection device shown in FIGS. 11a and 11b.

FIG. 12 is a perspective view of the holographic projection device shown in FIGS. 11a and 11b. The projection device has again been divided into three sections, A, B and C, which facilitates to explain both the coherent and non-coherent direction with the help of the coordinate system indicated in the top left corner of the Figure. In section A, the coherent direction corresponds with the x coordinate, and the non-coherent direction corresponds with the y coordinate. The direction of light propagation is represented by the z coordinate. In section B, the coherent direction again corresponds with the x coordinate, but the non-coherent direction corresponds with the z coordinate. The direction of light propagation is represented by the y coordinate. In section C, the coherent direction corresponds with the y coordinate, and the non-coherent direction corresponds with the z coordinate. The direction of light propagation is represented by the x coordinate. The imaging means 15 here comprises the three lens elements 15a, 15b and 15c. Because the number of imaging elements and imaging means is significantly smaller than that in FIG. 8, there are much fewer sources of aberrations, which is why aberrations can be minimised or eliminated much easier. In this embodiment it is again possible to dispose a beam splitter element 25 in the projection device in order to be able to reconstruct the scenes in colour. The beam splitter element 25 can be disposed for example between the imaging element 9 (=9') and the deflection element 21 for tracking the observer window 17, or between the light modulator device 3 and the imaging element 9 (=9'). Of course, other positions in the projection device are possible as well. This very compact version of the projection device is particularly suited for display devices which must be of small or minimal size.

Figure 13:
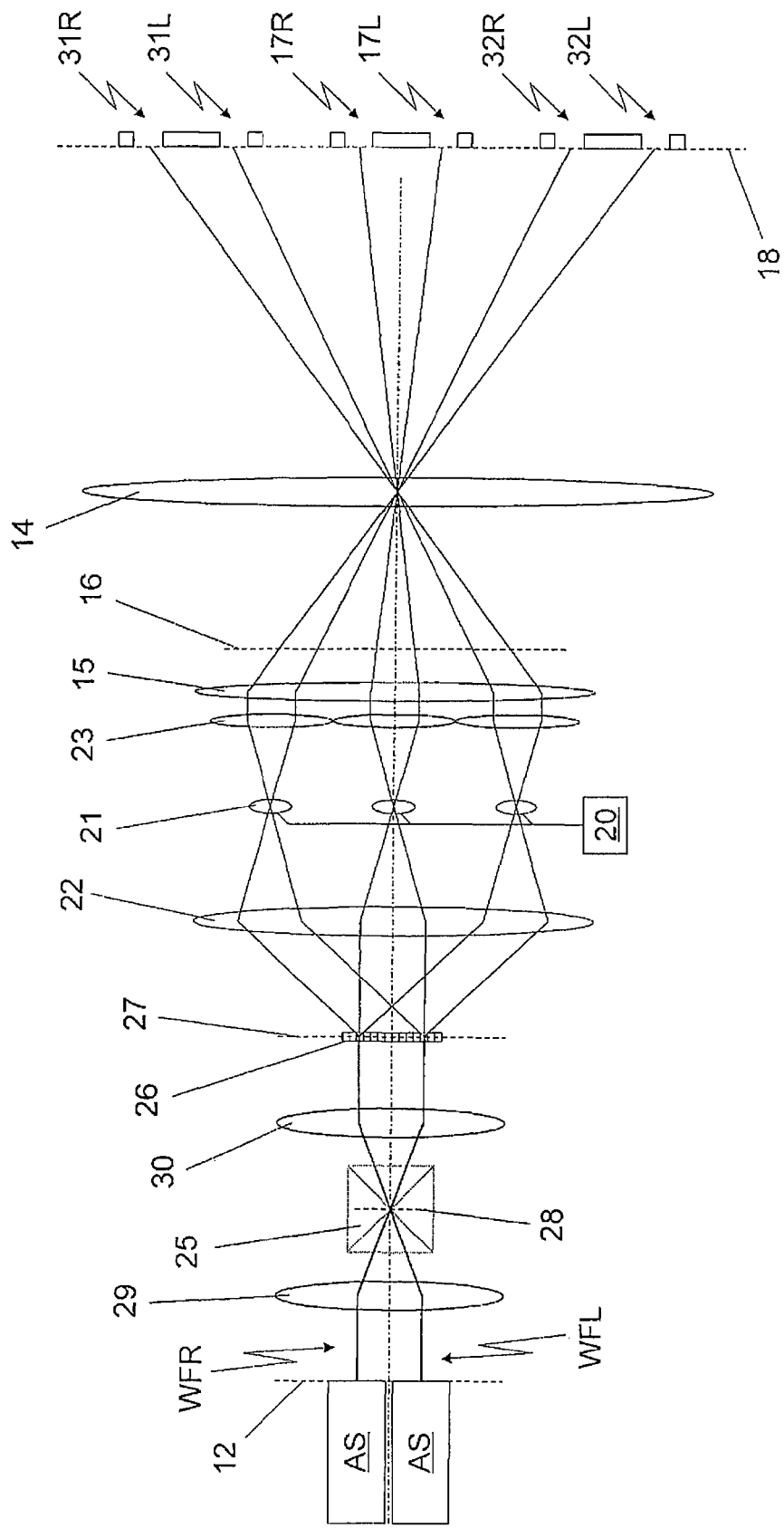
FIG. 13 shows schematically another holographic projection device according to the invention for multiple observers.

FIG. 13 is a top view which shows another embodiment of the holographic projection device, where if the light modulator device 3 is scanned line-wise the top view represents the coherent direction and if the light modulator device 3 is scanned column-wise the top view represents the non-coherent direction. The projection device according to this embodiment is intended for multiple observers in the observer plane 18. The projection device comprises two light modulator devices 3 and two scanning systems AS.

The holographic projection device further comprises a beam splitter element 26, which is used in addition to the beam splitter element 25 which splits the light up into its spectral components or which recomposes the light from these components in a plane 27, to multiply the wave fronts WFR and WFL which are emitted by the light modulator devices 3. Plane 27 is the imaging of plane 12 through the afocal system which comprises of the imaging means 29 and 30. Plane 12 can preferably coincide with the object-side focal plane of the imaging means 29, and plane 27 can preferably coincide with the image-side focal plane of the imaging means 29. At the same time, plane 27 coincides with the object-side focal plane of the imaging means 22. The beam splitter element 26 is thus disposed in plane 27, and it can be a grating, prism or diffractive optical element (DOE), in particular a configurable DOE. Further, it is possible to provide multiple light sources 2 for each light modulator device 3, depending on the number of observers in the observer plane 18, instead of the beam splitter element 26. The imaging elements 6 and 7 must in this case be disposed such that the light emitted by the light sources 2 impinges on the light modulator device 3 at different angles of incidence.

FIG. 13 is a top view. The holographic projection device according to this embodiment is intended for multiple observers, where the number of observers is generally not limited. For the reconstruction of the scene for the three observers, as shown in the Figure, the projection device comprises two scanning systems AS with one light modulator device 3 each, where one light modulator device 3 is always intended for the right eyes of the observers and the other light modulator device 3 for the left eyes of the observers. The two light modulator devices 3 are illuminated by the light sources 2 of the respective illumination devices 1, as described with respect to FIG. 1. The light emitted by these light sources is thereby modulated such that the waves W are encoded to form the desired wave fronts WFR and WFL at equidistant positions in the light modulator device 3. The functional principle of the scanning systems AS is for example as described with respect to FIGS. 2a and 2b. The wave fronts WFR and WFL are imaged by the imaging means 29 and 30 on to the beam splitter element 26, which is situated in plane 27. At the same time, a focal plane 28 of the imaging means 29 is imaged by the imaging means 30 and the imaging means 22 on to three deflection elements 21. Each observer is thus assigned a deflection element 21. Plane 27 is thereby simultaneously imaged by the imaging means 22, 23 and 15 three times (or once per imaging means 23) into a common focal plane 16 of the imaging means 23 and 15, said focal plane then being imaged through the screen 14 and three times into the observer plane 18, i.e. into the observer windows 17R, 17L, 31R, 31L, 32R and 32L, on to the eyes of the respective three observers. At the same time, the images of plane 28 on the deflection elements 21 are imaged by the imaging means 23 and 15 on to the screen 14 in an overlapping manner.

In the coherent direction, the Fourier transforms FT of the two modulated wave fronts WFR and WFL are imaged by the imaging element 10 and the imaging means 29 on to plane 28. Then, after multiplication of the Fourier transform FT by the beam splitter element 26 in plane 27 and deflection into another image plane of plane 28 by the deflection element 21, the multiplied Fourier transforms FT overlap on the screen 14. At the same time, the modulated wave fronts WFR and WFL, which are imaged into plane 12, are imaged into plane 27. After multiplication, the wave front WFR is simultaneously imaged by the imaging means 22, the three imaging means 23 and the imaging means 15 first into plane 16 and then into the observer plane 18 in the form of virtual observer windows 17R, 31R and 32R, on to the right eyes of the three observers. The wave front WFL is imaged accordingly so as to form virtual observer windows 17L, 31L and 32L for the left eyes of the three observers.

In the non-coherent direction, the scanning elements 5 of each scanning system AS are imaged into plane 12. Then the scanning elements 5, multiplied by the beam splitter element 26, are imaged into the observer windows 17R, 17L, 31R, 31L, 32R and 32L for the eyes of the three observers. At the same time, the beams are focused on to plane 28. Plane 28 in turn is imaged on to the screen 14.

Each observer is only assigned one deflection element 21. The number of deflection elements 21 thus corresponds with the number of observers. This means that per observer only one deflection element 21 is used for both eyes, here for example for observer windows 17R and 17L. If an observer moves in the observer plane 18, the changed eye positions are again detected by the position detection system 20, and the deflection means 21 are controlled such that the observer windows 17R, 17L, 31R, 31L, 32R and 32L are tracked in accordance with the new eye positions of the observers. The three-dimensional scene can be reconstructed in colour as described above using the beam splitter element 25.

FIGS. 14a and 14b show a second embodiment of a scanning system AS in the coherent and non-coherent direction, said embodiment being in contrast to FIGS. 2a and 2b. FIG. 14a shows the scanning system AS in the coherent direction and FIG. 14b shows it in the non-coherent direction. The projection device according to the present embodiment functions such that the modulated wave front WF is not imaged into the observer window 17, as in the other embodiments mentioned and described above, but on to the screen 14. Consequently, the Fourier transform FT is not imaged on to the screen 14 but into the observer window 17. The scanning system AS again comprises the illumination device 1 with the light source 2, the scanning element 5, the light modulator device 3 and imaging elements 6, 7 (7a, 7b), 8 and 9 (=9'). The imaging elements 6, 7, 8 and 9 (=9') can be lenses, in particular diffractive optical elements (DOE) and Fresnel lenses, but also lens arrays or mirrors. These imaging elements 6, 7, 8 and 9 (=9') can be spherical or cylindrical or disposed off-axis, which aims at minimising aberrations, and which helps making the holographic projection device more compact. The light modulator device 3 in FIGS. 14a and 14b is of a reflective type (but again, the optical path is shown unfolded). However, it can be of a transmissive type as well.

It is advantageous if diffractive optical elements are used as imaging elements in the coherent direction, because their design and functional principle are better suited to achieving aberration correction. Now, the functional principle of the scanning system AS in the coherent direction is described. The light source 2 of the illumination device 1 emits sufficiently coherent light in the form of a wave W, which is directed on to the imaging means 6 for broadening. The wave W then passes through the imaging means 7 and is focussed on to the scanning element 5. This wave W is then focussed by the imaging element 8 into plane 11, which is situated in the image-side focal plane of the imaging element 8. After a preferable deflection of wave W by a deflection element, which can be a mirror and which is disposed in plane 11, this wave is impinges through the imaging element 9 preferably in the form of a plane wave front on to the light modulator device 3. The wave front WF modulated by the light modulator device 3 is then imaged by the imaging element 9' (=9), into a plane 11', which is situated in the image-side focal point of the imaging element 9' (=9). Because the light modulator device 3 is of a reflective type in this embodiment, planes 11 and 11' coincide. At the same time, a Fourier transform FT is created in plane 11'.

It must be noted here again that the imaging elements 9 and 9' are represented by one single imaging element, because the light modulator device 3 is of a reflective type, so that the modulated wave front WE is reflected back into plane 11 (=11'). Further, a preferable deflection element in plane 11 (=11') is not necessarily required, so that it is possible to replace the imaging elements 8 and 9 by a single imaging element. If this is the case, the scanning element 5 will be disposed in the object-side focal plane of the imaging elements 8 and 9.

In the non-coherent direction, shown in FIG. 14*b*, it can also be preferable if Fresnel lenses or diffractive optical elements are used as imaging means 6, 7, 8 and 9 (=9'). The functional principle of the scanning system AS in the non-coherent direction is explained below. Here, two arrangements of modulation elements 4 on the light modulator device 3 are scanned one after another, although these two scans are shown at the same time in the Figure. The beams which are emitted by the light source 2 are broadened by the imaging element 6 and focussed by the imaging element 7 into a plane P, which is situated behind the scanning element 5, seen in the direction of light propagation. The scanning element 5 deflects the beams according to the arrangement of modulation elements 4 of the light modulator device 3 to be scanned. From that plane P, the beams are focussed by the imaging elements 8 and 9 through the plane 11 and on to the light modulator device 3, as described with respect to FIG. 1. This means that the light deflected by the scanning element 5, or more precisely the deflected beams, impinge on the light modulator device 3 parallel with or at a defined angle to the optical axis OA of the scanning system AS, where the distance between the beams and the optical axis OA differs depending on which one-dimensional arrangement of modulation elements 4 on the light modulator device 3 is being scanned. Between the imaging elements 8 and 9 the optical paths run in parallel. The imaging element 9 (=9') contributes to the focussing. The beams thus modulated by the light modulator device 3 are then imaged by the imaging element 9' (=9) to infinity and impinge on plane 11'. At the same time, the scanning element 5 is imaged by the imaging means 8 into plane 11 and then by the imaging means 9' (=9) into plane 11' again.

Further, the imaging element 7 may be disposed such that the first imaging of beams in the non-coherent direction can be created virtually. Moreover, the imaging elements 6 and/or 7, which is/are disposed between the light source 2 and the scanning element 5, may be omitted, if the light source 2 is designed such that the emitted beams already conform with the required properties, e.g. as regards aperture width. The scanning element 5 can of course also be a scanning prism, as described with respect to FIGS. 4*a* to 4*c*.

In a more compact version of the scanning system AS according to FIGS. 14*a* and 14*b*, which is not shown here, the imaging element 9 (=9') may be omitted, so that the scanning element 5 would act as a deflection element in order to prevent overlapping of light on the way to and from the light modulator device 3.

Figure 15:
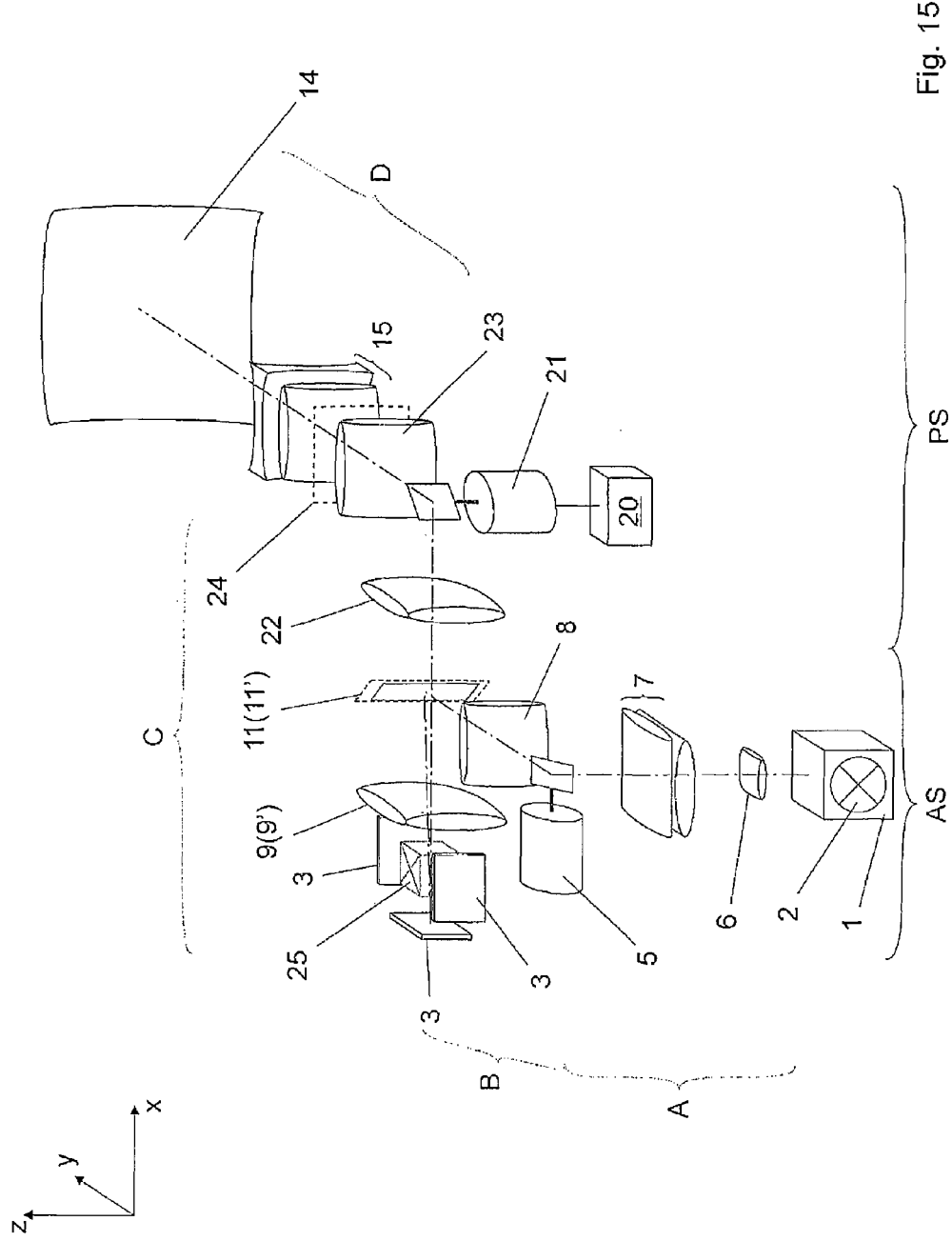
FIG. 15 is a perspective view of the holographic projection device shown in FIGS. 14a and 14b.

FIG. 15 is a perspective view of the holographic projection device shown in FIGS. 14*a* and 14*b*. The projection device comprises a scanning system AS and a projection system PS, as already shown above in FIG. 8. The coherent and non-coherent directions can be identified with the help of the coordinate system in the top left corner of the Figure; see the description of FIG. 8 for details. In contrast to FIG. 8, the imaging element 8 is only a single lens element. The imaging element 10 is not needed to reconstruct a scene. This projection device is anamorphic, as can also be seen in FIGS. 14*a* and 14*b*. The imaging element 7 comprises two lens elements, but only one of these lens elements is optically effective in each direction, i.e. the coherent and the non-coherent direction, whereas the other lens element is optically ineffective. The virtual observer window 17 can again for example be disposed behind the screen 14 or, if the screen 14 is of a reflective type, beside it or in front of it. The observer window 17 is thus not shown in this Figure.

The holographic projection device, in particular the projection system PS, again includes a position detection system 20 for detecting the eye positions of at least one observer in the observer plane 18 when viewing a reconstructed scene and for tracking the observer window 17 accordingly. The position detection system 20 can, for example, be a camera in conjunction with the deflection element 21 which is provided for tracking the virtual observer window 17 in the observer plane 18 in accordance with changes in the observer's eye positions. The deflection element 21 is in that case disposed between the two imaging means 22 and 23. The imaging means 22 and 23 represent an afocal system, where the deflection element 21 is disposed in the image-side focal point of the imaging means 22, which is at the same time the object-side focal point of the imaging means 23. The deflection element 21 can be discretely controlled and is preferably a mirror element, as described with respect to FIG. 7. Further, the deflection element 21 deflects the beams in at least one direction, i.e. horizontal and/or vertical. This means that in the case of one-dimensional scanning of the light modulator device 3, the deflection element 21 only tracks the observer window 17 in either the horizontal or the vertical direction. A wave front, which contains the information required to reconstruct preferably a three-dimensional scene, is generated in the scanning system AS, as described with respect to FIGS. 14*a* and 14*b*. This is why only the projection system PS is described for both the coherent and non-coherent direction. In the coherent direction, the modulated wave front WF is imaged to infinity and then by the imaging element 9' and the imaging means 22 on to the deflection element 21. After that, the wave front WF is imaged by the imaging means 23 and 15 on to the screen 14. At the same time, a Fourier transform FT is created in plane 11'. This Fourier transform FT is imaged into the plane 24, which is situated in front of the imaging means 15. From this plane 24, the Fourier transform FT is imaged by the imaging means 15 and through the screen 14 into the virtual observer window 17 (not shown). In the non-coherent direction, the scanning element 5 is imaged into plane 11' in the scanning system AS, and the beams are imaged in the form of parallel bundles of rays. The imaging means 22 and 23 then image the scanning element 5 into the plane 24, which is situated in front of the imaging means 15. From plane 24 the scanning element 5 is imaged by the imaging means 15 and through the screen 14 into the virtual observer window 17. At the same time, the beams are imaged on to the deflection element 21 and then by the imaging means 23 and 15 on to the screen 14.

The thus reconstructed scene can be observed in a frustum-shaped reconstruction volume 19 (not shown), which stretches between the observer window 17 and the imaging means 15. The virtual observer window 17 can be as large as the eye separation of an observer, but it may also be smaller or larger. If the observer window 17 is smaller than an eye separation, two light modulator devices 3 are required, so that the scene can be viewed with both eyes.

It is again possible in this embodiment to dispose the beam splitter element 25 in the projection device, for example at a suitable position between the plane 11' and the imaging means 22 in front of the deflection element 21, in order to be able to reconstruct the scenes in colour. Of course, other positions in the projection device are possible as well, as indicated for this embodiment in the Figure. Here, the beam splitter element 25 is disposed between the three light modulator devices 3 for the three primary colours and the imaging element 9 (=9'). This embodiment thus allows simultaneous colour reconstruction of a three-dimensional scene. It is of course also possible to holographically reconstruct the colour three-dimensional scene sequentially, e.g. using only one light modulator device 3.

Of course, it is possible to depart from the embodiments shown above without leaving the scope of the invention.

Possible applications of the holographic projection device include displays for a two- and/or three-dimensional presentation in private or working environments, for example computer displays, mobile phone displays, TV screens, electronic games, in the automotive industry for displaying information, in the entertainment industry, in medical engineering and in military engineering for the representation of surface profiles. It will appear to those skilled in the art that the present projection device can also be applied in other areas not mentioned above.

The invention claimed is:

1. Holographic projection device for the reconstruction of two- or three-dimensional scenes to be viewed through at least one virtual observer window in an observer plane by an observer, the holographic projection device comprising at least one light source which emits sufficiently coherent light for the generation of a wave front, and with at least one light modulator device comprising modulation elements and which is of a two-dimensional design, wherein the light modulator device is provided for the modulation of the amplitude and/or phase of incident light, wherein at least one scanning system and one projection system are provided, where the scanning system comprises the at least one light source, the at least one light-modulator device and the at least one scanning element, and where the light modulator device and the scanning element are combined such that the light emitted by the scanning element scans one after another one-dimensional arrangements of modulation elements of the two-dimensional light modulator device, where the scanning system is designed such that it sequentially creates a wave front which contains the information required for reconstructing the two- or three-dimensional scene, and where the projection system comprises an optical element serving as a screen on which a Fourier transform is imaged and whose size is chosen such that a periodic continuation of diffraction orders lies outside of the screen, and at least one imaging means and the at least one virtual observer window where the projection system is designed such that it subsequently reconstructs the two- or three-dimensional scene.

2. Holographic projection device according to claim 1 wherein the holographic projection device comprises an anamorphic design or wherein the holographic projection device is configured to enable different magnification in two directions perpendicular to each other.

3. Holographic projection device according to claim 1 wherein the scanning system comprises the at least one light source, the at least one light modulator device, the scanning element and imaging elements, and that the scanning system is disposed in front of the projection system, seen in the direction of light propagation.

4. Holographic projection device according to claim 1 wherein the light deflected by the scanning element impinges on the light modulator device at angles to an optical axis of the scanning system, where the distance between the beams and the optical axis differs depending on which one-dimensional arrangement of modulation elements is being scanned.

5. Holographic projection device according to claim 1 wherein the scanning element has a rotation axis and can be rotated such that the incident light is offset parallel with an optical axis of the scanning system after its passage through the scanning element.

6. Holographic projection device according to claim 5 wherein two parallel surfaces of the scanning element for scanning the one-dimensional arrangement of modulation elements of the light modulator device are disposed at a controllable angle to the optical path.

7. Holographic projection device according to claim 1, wherein a reproduction scale of the screen is chosen such that a periodic continuation of diffraction orders lies outside the screen.

8. Holographic projection device according to claim 1, further comprising a position detection system for the detection of changes in eye positions of at least one observer situated in an observer plane when viewing the reconstructed scene.

9. Holographic projection device according to claim 8, further comprising at least one deflection element for tracking the at least one virtual observer window in the observer plane according to a change in an observer's eye position.

10. Holographic projection device according to claim 1, further comprising at least one beam splitter element for colour reconstruction of a scene.

11. Method for the holographic reconstruction of two- or three-dimensional scenes to be viewed through at least one virtual observer window in an observer plane by an observer, where at least one light source illuminates at least one two-dimensional light modulator device comprising modulation elements with sufficiently coherent light, where the at least one light modulator device modulates the amplitude and/or phase of incident light, wherein only one-dimensional arrangements of modulation elements of the two-dimensional light modulator device are scanned one after another by a scanning element, so that multiple one-dimensional wave fronts are generated, where a wave front which contains the information required for reconstructing a two- or three-dimensional scene is generated sequentially with the help of the one-dimensional wave fronts, where one Fourier transform of the light emitted by the light source and modulated by the light modulator device per one-dimensional arrangement of modulation elements is imaged on to an optical element which serves as a screen, where at least the optical element images a wave front modulated by the light modulator device into the at least one virtual observer window and whereupon a two- or three-dimensional scene is reconstructed.

12. Method according to claim 11 wherein the Fourier transforms of the sequentially scanned one-dimensional arrangements of modulation elements are imaged to different positions on the optical element.

13. Method according to claim 11 wherein the scanning element rotates around a rotation axis, whereby the light used for scanning is offset parallel to an optical axis of a scanning system.

14. Method according to claim 11 wherein a position detection system detects at least one eye position of at least one observer who is viewing the reconstructed scene.

15. Method according to claim 14 wherein at least one deflection element tracks a virtual observer window for at least on observer eye according to a change in the observer's eye position in an observer plane.

16. Method according to claim 11 wherein a colour reconstruction of the scene is performed simultaneously for the three primary colours.

17. Method according to claim 11 wherein a colour reconstruction of the scene is performed sequentially for the three primary colours.

\* \* \* \* \*